(12) United States Patent
Safai et al.

(10) Patent No.: US 12,391,001 B2
(45) Date of Patent: Aug. 19, 2025

(54) NANOSTRUCTURES FOR PROCESS MONITORING AND FEEDBACK CONTROL

(71) Applicant: The Boeing Company, Chicago, IL (US)

(72) Inventors: Morteza Safai, Newcastle, WA (US); Gary E. Georgeson, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 96 days.

(21) Appl. No.: 17/527,054

(22) Filed: Nov. 15, 2021

(65) Prior Publication Data
US 2022/0072793 A1 Mar. 10, 2022

Related U.S. Application Data

(62) Division of application No. 15/495,925, filed on Apr. 24, 2017, now Pat. No. 11,173,664.

(51) Int. Cl.
B33Y 10/00 (2015.01)
B29C 64/386 (2017.01)
(Continued)

(52) U.S. Cl.
CPC .............. *B29C 64/386* (2017.08); *B33Y 10/00* (2014.12); *B33Y 50/00* (2014.12); *B82Y 35/00* (2013.01);
(Continued)

(58) Field of Classification Search
CPC .................................. B33Y 10/00; B33Y 50/00
See application file for complete search history.

(56) References Cited

U.S. PATENT DOCUMENTS 6,114,038 A   9/2000  Castro et al.
7,902,524 B2  3/2011  Safai et al.
              (Continued)

FOREIGN PATENT DOCUMENTS

CN   102272644   12/2011
CN   104407409    3/2015
              (Continued)

OTHER PUBLICATIONS

Li, S., Zhang, K., Yang. J.M., Lin, L. and Yang, H., 2007. Single quantum dots as localtemperature markers. Nano letter, 7(10), pp. 3102-3105. https://pubs.acs.org/doi/abs/10.1021/nl071606p (Year: 2007).

(Continued)

*Primary Examiner* — Nicholas R Krasnow
(74) *Attorney, Agent, or Firm* — Yee & Associates, P.C.

(57) ABSTRACT

Various techniques are provided to utilize nanostructures for process monitoring and feedback control. In one example, a method includes forming a layer of material including nanostructures distributed therein. Each nanostructure includes a quantum dot and a shell encompassing the quantum dot. The shells and quantum dots are configured to emit a first and second wavelength, respectively, in response to an excitation signal. The method further includes applying the excitation signal to at least a portion of the layer of material. The method further includes detecting an emitted signal from the portion of the layer of material, where the emitted signal is provided by at least a subset of the nanostructures in response to the excitation signal. The method further includes determining whether a manufacturing characteristic has been satisfied based at least on a wavelength of the emitted signal. Related systems and products are also provided.

20 Claims, 9 Drawing Sheets

(51) Int. Cl.
*B33Y 50/00* (2015.01)
*B82Y 35/00* (2011.01)
*B82Y 40/00* (2011.01)

(52) U.S. Cl.
CPC ............ *B82Y 40/00* (2013.01); *Y10S 977/774* (2013.01); *Y10S 977/892* (2013.01); *Y10S 977/955* (2013.01); *Y10S 977/956* (2013.01)

(56) References Cited

U.S. PATENT DOCUMENTS

| | | | |
|---|---|---|---|
| 7,925,452 B2 | 4/2011 | Safai et al. | |
| 8,185,326 B2 | 5/2012 | Safai et al. | |
| 9,555,623 B1 | 1/2017 | Williams et al. | |
| 9,887,356 B2 | 2/2018 | McAlpine et al. | |
| 11,643,366 B2* | 5/2023 | Gardiner | B22F 12/44 |
| 2006/0060998 A1 | 3/2006 | Strouse et al. | |
| 2009/0181172 A1 | 7/2009 | Parpia et al. | |
| 2012/0132930 A1 | 5/2012 | Young et al. | |
| 2014/0265035 A1 | 9/2014 | Buser et al. | |
| 2015/0366073 A1* | 12/2015 | Magdassi | B22F 10/14 |
| | | | 264/494 |
| 2016/0236279 A1* | 8/2016 | Ashton | B22F 12/44 |
| 2016/0332381 A1* | 11/2016 | Long | B22F 10/40 |
| 2016/0349088 A1 | 12/2016 | Patel | |
| 2017/0016781 A1* | 1/2017 | Dave | B33Y 50/00 |
| 2017/0090462 A1 | 3/2017 | Dave et al. | |
| 2017/0306221 A1* | 10/2017 | Koole | C03C 14/004 |
| 2017/0355019 A1 | 12/2017 | Karlen | |
| 2017/0369827 A1 | 12/2017 | Langenfeld et al. | |
| 2018/0043677 A1* | 2/2018 | Ochi | B29C 64/112 |
| 2018/0295728 A1* | 10/2018 | Yudovin-Farber | H05K 3/125 |
| 2018/0304549 A1* | 10/2018 | Safai | B29C 64/386 |
| 2019/0022930 A1* | 1/2019 | Hinch | B33Y 70/00 |
| 2019/0039294 A1* | 2/2019 | Stasiak | C09D 7/61 |
| 2019/0047226 A1* | 2/2019 | Ishikawa | B33Y 50/02 |
| 2019/0105842 A1* | 4/2019 | Dau | B33Y 50/00 |
| 2019/0128738 A1* | 5/2019 | Lo | G01J 5/53 |
| 2019/0232557 A1* | 8/2019 | Hart | B22F 10/10 |
| 2020/0171877 A1* | 6/2020 | Chen | B32B 7/12 |
| 2020/0395543 A1 | 12/2020 | Han | |
| 2021/0016351 A1* | 1/2021 | Kusaka | B22F 10/28 |
| 2021/0179878 A1* | 6/2021 | Stasiak | B29C 64/165 |
| 2021/0187836 A1* | 6/2021 | Stasiak | B29C 64/165 |
| 2021/0215636 A1* | 7/2021 | Claussen | G01N 33/5438 |
| 2021/0277268 A1* | 9/2021 | Martin | B41M 5/0023 |
| 2022/0134659 A1* | 5/2022 | Leard | B23K 26/082 |
| | | | 427/597 |
| 2022/0134670 A1* | 5/2022 | Batchelder | B33Y 50/02 |
| | | | 156/64 |
| 2022/0145059 A1* | 5/2022 | Wu | B29C 64/153 |
| 2022/0324026 A1* | 10/2022 | Beckett | B33Y 50/02 |
| 2022/0395904 A1* | 12/2022 | Lock | G01N 25/02 |
| 2023/0242785 A1* | 8/2023 | Hayashi | C08F 222/1025 |
| | | | 522/64 |
| 2023/0352725 A1* | 11/2023 | Golodnitsky | H01M 50/403 |
| 2024/0117095 A1* | 4/2024 | Elliott, III | C09D 11/101 |

FOREIGN PATENT DOCUMENTS

| | | |
|---|---|---|
| CN | 105602546 A | 5/2016 |
| CN | 106009573 | 10/2016 |
| JP | 2017205868 A | 11/2017 |

OTHER PUBLICATIONS

Tapia, G. and Elwany, A., 2014. A review on process monitoring and control in metal-based additive manufacturing. Journal of Manufacturing Science and Engineering, 136(6), p. 060801. https://doi.org/10.1115/1.4028540 (Year: 2014).

Chattopadhyay, S., Sen, P., Thomas Andrews, J. and Kumar Sen, P., 2012. Semiconductor core-shell quantum dot: a low temperature (Year: 2012).

Wang, X., Cui, Y., Yu, S., Zeng, Q. and Yang, M., 2016. Core-shell interaction and its impact on the optical absorption of pure and doped (Year: 2016).

Kousiatza (NPL 2017) Kousiatza, C., Chatzidai, N. and Karalekas, D., 2017. Temperature mapping of 3D printed polymer plates: Experimental and numerical study. Sensors, 17(3), p. 456. https://www.mdpi.com/1424-8220/17/3/456/pdf (Year: 2017).

* cited by examiner

NANOSTRUCTURES FOR PROCESS MONITORING AND FEEDBACK CONTROL

CROSS REFERENCE TO RELATED APPLICATION

This application is a divisional application of, and claims priority to and the benefit of, U.S. patent application Ser. No. 15/495,925, filed Apr. 24, 2017, U.S. Pat. No. 11,173,664, issued Nov. 16, 2021, and entitled "Nanostructures for Process Monitoring and Feedback Control," which is hereby incorporated by reference in its entirety.

BACKGROUND

Technical Field

The present application generally relates to the monitoring of manufacturing processes and, more specifically, to nanostructures for process monitoring and feedback control of additive manufacturing processes.

Related Art

Additive manufacturing (e.g., also referred to as three-dimensional (3D) printing), is a flexible and cost effective technology for making complex products. In additive manufacturing, an object is formed by depositing material in a layer-based approach. In this regard, successive layers of material are built up on top of each other until the final object is fully formed. Related manufacturing operations (e.g., the application of temperature, pressure, and/or other operations) may be performed before, during, or after various layers are deposited.

Unfortunately, many conventional additive manufacturing processes lack efficient quality control measures. In many cases, a manufactured object may not be thoroughly inspected until the manufacturing process is already complete. This can prove costly and inefficient since a mistake in manufacture may not be detected until it is too late to fix. Indeed, considerable time, energy, and material may be wasted if the manufactured object is rendered unusable by such a mistake.

Although certain non-destructive evaluation (NDE) measures may sometimes be used to evaluate the quality of a manufacturing process (e.g., inspection by X-ray computed tomography or ultrasound), such NDE approaches tend to be very costly, time consuming, and/or inadequate for effective evaluation. Therefore, there is a need for an improved approach for inspecting products formed by additive manufacturing processes.

SUMMARY

In accordance with various embodiments further discussed herein, quantum dot-based nanostructures are provided in an additive manufacturing material. The nanostructures may be used to evaluate whether a manufacturing characteristic of an additive manufacturing process has been satisfied. The nanostructures may include a quantum dot encompassed by a shell, wherein the quantum dot and the shell are configured to emit different wavelengths in response to an excitation signal (e.g., also referred to as a verification signal). The shell may be configured to be removed when a corresponding manufacturing characteristic has been satisfied. By exciting the nanostructures during an additive manufacturing process (e.g., during or between the deposition of different layers), the manufacturing characteristic can be evaluated while the manufacturing process is in progress. As a result, the manufacturing process may be interrupted if the manufacturing characteristic is not satisfied, thus saving significant time, cost, and material.

According to an embodiment, a method may include forming a layer of material including a plurality of nanostructures distributed therein. Each nanostructure may include a quantum dot and a shell encompassing the quantum dot. The shells may be configured to emit a first wavelength in response to an excitation signal. The quantum dots may be configured to emit a second wavelength in response to the excitation signal. The method may further include applying the excitation signal to at least a portion of the layer of material. The method may further include detecting an emitted signal from the portion of the layer of material, where the emitted signal may be provided by at least a subset of the plurality of nanostructures in response to the excitation signal. The method may further include determining whether a manufacturing characteristic has been satisfied based at least on a wavelength of the emitted signal According to another embodiment, a system may include a manufacturing device configured to form a layer of material including a plurality of nanostructures distributed therein. Each nanostructure may include a quantum dot and a shell encompassing the quantum dot. The shells may be configured to emit a first wavelength in response to an excitation signal. The quantum dots may be configured to emit a second wavelength in response to the excitation signal. The system may further include an excitation device configured to apply the excitation signal to at least a portion of the layer of material. The system may further include a detection device configured to detect an emitted signal from the portion of the layer of material, where the emitted signal is provided by at least a subset of the plurality of nanostructures in response to the excitation signal. The system may further include a computing device configured to determine whether a manufacturing characteristic has been satisfied based at least on a wavelength of the emitted signal.

According to another embodiment, a product may include an additive manufacturing material. The product may further include a plurality of nanostructures distributed within the material and configured to receive an excitation signal and provide an emitted signal in response thereto. Each nanostructure may include a quantum dot and a shell encompassing the quantum dot. The shells may be configured to emit a first wavelength in response to the excitation signal based on a first band gap associated with the shells. The shells may be configured to be removed from the nanostructures in response to a manufacturing operation performed on the product. The removal of the shells may cause the emitted signal to exhibit the second wavelength. The quantum dots may be configured to emit a second wavelength in response to the excitation signal based on a second band gap associated with the quantum dots.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
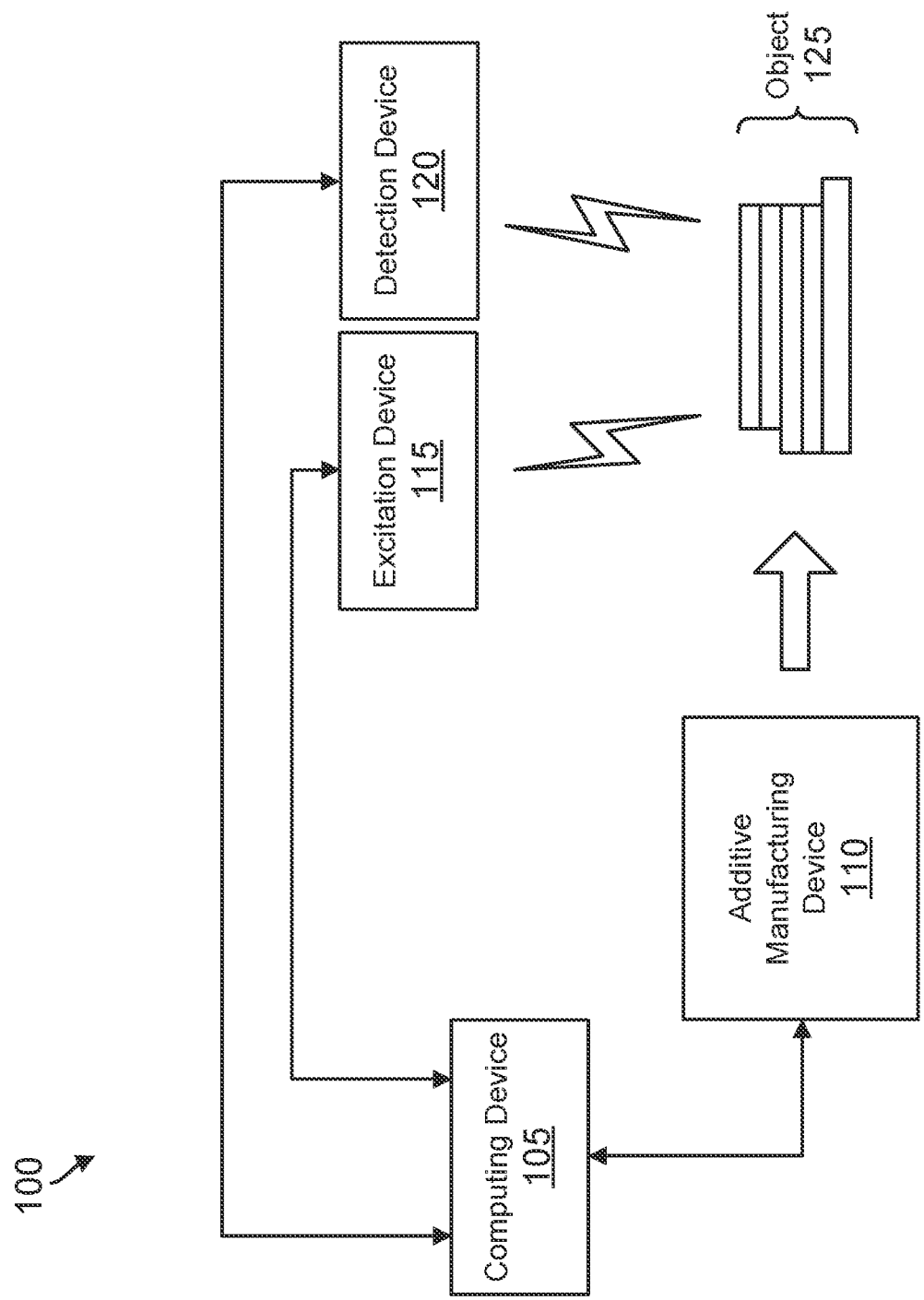
FIG. 1 illustrates a system for using nanostructures to monitor a manufacturing process in accordance with an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Various techniques are provided to facilitate the use of nanostructures to monitor (e.g., evaluate, validate) an additive manufacturing process. Additive manufacturing may be utilized to form layers through use of material deposition, laser deposition, laser heating, magnetic heating, and/or other processes for depositing materials and aligning polymers (e.g., through curing operations). In some embodiments, the nanostructures are distributed in material(s) deposited in an additive manufacturing process to facilitate monitoring of the process. The nanostructures may be mixed with (e.g., integrated into) the deposition material(s) and then deposited along with the deposition material(s) to form layers of an object (also referred to as a product). The object may be a part of an aircraft, an antenna, and/or generally any object amenable to manufacturing using an additive manufacturing process.

The nanostructures include a quantum dot (also referred to as a core or a quantum dot core) and at least one shell encompassing the quantum dot. For example, the nanostructures can be provided in a lattice-type structure in the deposited material(s). In some cases, the shell(s) of the nanostructures may be doped, e.g. with metal material, prior to being mixed with the deposition material(s). Energy coupling mechanisms such as Förster resonance energy transfer (FRET) may be utilized to facilitate the binding of the nanostructures with one another and binding of a quantum dot to the encompassing shell. In general, the nanostructures are configured (e.g., designed, formed, fabricated) such that the properties of the material(s) deposited in the manufacturing process and an object formed by the manufacturing process are not affected by the presence of the nanostructures or components thereof (e.g., quantum dots, shells). The nanostructures may be one-part-per-million or less (e.g., by weight) relative to the deposition material(s).

Electrons within the quantum dots and the shells can absorb energy, such as electricity, sunlight, heat, microwaves, or electromagnetic (EM) radiation, and emit energy (e.g., as EM radiation or as a current) in response. In an embodiment, a layer of material(s) with the nanostructures distributed therein is excited by EM radiation and emits EM radiation in response. When an excitation signal (e.g., EM radiation) associated with energy higher than the band gap of the nanostructures is applied to the nanostructures, the excitation signal is absorbed by the nanostructures and a signal is emitted (e.g., via fluorescence). The emitted signal has an energy that is based on the band gap of the nanostructures. Equivalently, as the emitted signal's wavelength is inversely proportional to the emitted signal's energy, the emitted signal has a wavelength based on the band gap of the nanostructures. The emitted signal has a lower energy (or equivalently a higher wavelength) than the excitation signal. The excitation signal and the emitted signal may have wavelengths in the visible light region, infrared region, ultraviolet (UV) region, and/or generally any wavelength suitable for excitation and/or detection (e.g., of the emitted signal).

The quantum dot and its encompassing shell generally include different materials and exhibit different properties, such as different melting points and band gaps. In this regard, the dopants of the shell may be utilized to tune the wavelength of the emitted signal from the shell. Thus, when the shells are intact, the excitation signal is absorbed by the shells and a signal that has a wavelength associated with the band gap of the shells is emitted. In this case, the quantum dots of the nanostructures are blocked from the excitation signal by their encompassing shells and/or an emitted signal from the quantum dots in response to any portion of the excitation signal received by the quantum dots is blocked by the shells. When the shells are removed (e.g., melted, dissolved, deactivated) and the quantum dots are intact, the excitation signal is absorbed by the now exposed quantum dots and a signal that has a wavelength associated with the band gap of the quantum dots is emitted. In this regard, the removal of the shell and associated exposing of the interior quantum dot can be referred to as fluorescent activation of the quantum dot.

As used herein, the wavelength of the excitation signal is represented by $\lambda_1$ and the wavelength of the emitted signal from a shell and a quantum dot are represented by $\lambda_2$ and $\lambda_3$, respectively. In an embodiment, as the nanostructures distributed in the deposited material are generally not completely identical (e.g., size and/or shape are not uniform), $\lambda_2$ and $\lambda_3$ may represent a range of wavelengths that may be associated with the shell and quantum dot, respectively. In some cases, $\lambda_1$ may also represent a range of wavelengths. The wavelengths at which the quantum dot and the shell fluoresce are generally selected to be far enough apart that they can be distinguished from each other. In some cases, when the wavelengths are in the visible-light spectrum, emissions of the quantum dots and the shells can be observed as different colors.

In an embodiment, the detected emitted signal can be associated with manufacturing characteristics of manufacturing operations performed in the manufacturing process to facilitate monitoring of the manufacturing process. The manufacturing operations may include heating operations, pressurizing operations, curing operations, and/or other operations to manufacture the object. The various operations may be utilized, for example, to enhance the structural integrity (e.g., harden, toughen) of the deposited material(s) (e.g., and the completed object by extension), such as by cross-linking of polymer chains in the deposited material, and/or define other properties of the object. The manufacturing operations may be associated with manufacturing operations, such as a specified temperature and/or specified pressure to be reached.

For example, a manufacturing operation may be a curing operation performed at a specified temperature. In this regard, the manufacturing characteristic of the curing operation may be, or may include, the specified temperature that needs to be reached. The shells may be configured to be removed and the quantum dots configured to remain intact when the specified temperature has been reached.

In this example, the nanostructures may be utilized to determine whether the curing operation is properly performed (e.g., performed at the specified temperature). Using the emitted signal from nanostructures distributed in the deposition materials, the specified temperature can be determined to have been reached (e.g., the manufacturing characteristic can be determined to have been satisfied) based on wavelength components contained in the emitted signal. For example, the presence of the wavelength component associated with the quantum dots in the emitted signal and lack of presence of the wavelength component associated with the shells in the emitted signal are indicative of the shells of the nanostructures having been removed. In turn, the shells having been removed may indicate that the specified temperature has been reached. In some cases, an intensity, or any other measure of power transferred per unit area or volume, of the wavelength components (e.g., of the quantum dots and shells) can be utilized to make the determination.

Thus, using various embodiments, the additive manufacturing process can be monitored (e.g., in real time) as each layer of material with nanostructures distributed therein is formed. An excitation signal may be applied to at least a portion of the layer and an emitted signal detected from the portion of the layer to which the excitation signal was applied. A manufacturing characteristic (e.g., temperature, pressure, pH level) associated with a manufacturing operation can be determined to have been satisfied or not satisfied based at least on the wavelength of the emitted signal. In this regard, in cases that the manufacturing operation is utilized to enhance cross-linking of polymers in the object, the manufacturing characteristic not having been satisfied may indicate a potential flaw in the deposited layer, such as improper or insufficient cross-linking of the polymers that may ultimately lead to a defective final product.

When a potential flaw is detected, the manufacturing process may be interrupted. Information associated with a potential flaw can be caught in-process with minimal latency and fed back for processing, such as manually by an operator (also referred to as a user) of the manufacturing process and/or autonomously by a computing device. Additional analysis may be utilized to verify that the flaw exists and determine regions/portions of the deposited layer that exhibit the flaw. Depending on the application and situation, in some cases, the manufacturing process can be adjusted to allow repair of the deposited layer or regions/portions of the deposited layer associated with the flaw. In other cases, the manufacturing process can be ended and the object discarded.

Accordingly, the manufacturing process can be evaluated in-process as the layers are formed and manufacturing operations are performed on the layers, and the manufacturing process adjusted to fix any potential flaws as they arise and/or end the manufacturing process. In this regard, costs and resources (e.g., of material(s) and time) can be reduced. For example, costs associated with obtaining the information and determining whether to proceed with the manufacturing process (e.g., with or without adjusted parameter values) may be lower than manufacturing a defective final product that needs to be discarded and needing to perform a new manufacturing process to manufacture the product. In some cases, minimal or no post-process NDE is performed on the completed product, thus reducing associated cost and complexity.

In an embodiment, not all of the deposited layers are evaluated. In some cases, these deposited layers do not have nanostructures distributed therein. In other cases, these deposited layers may have nanostructures distributed therein. For example, in these latter cases, the cost (e.g., time cost, component cost) and/or complexity associated with distributing nanostructures in the deposited material of some layers and not in other layers may be higher than distributing nanostructures in all deposited layers of material.

Referring now to the drawings, FIG. 1 illustrates a system 100 for using nanostructures to monitor a manufacturing process in accordance with an embodiment of the present disclosure. The system 100 includes a computing device 105, an additive manufacturing device 110, an excitation device 115, and a detection device 120. In an embodiment, the manufacturing process is an additive manufacturing process, in which a material(s) is deposited layer-by-layer to form an object 125.

The computing device 105 performs operations to facilitate performing and monitoring of the manufacturing process. In particular, the computing device 105 may perform operations to define, coordinate, and/or adjust the manufacturing process and associated monitoring process (e.g., evaluating process) as appropriate. The computing device 105 may be electronically coupled (e.g., wired and/or wirelessly) to the additive manufacturing device 110, excitation device 115, and detection device 120 to facilitate communication, e.g. for the computing device 105 to transmit commands and/or information to the devices 110, 115, and/or 120 and receive information from the devices 110, 115, and/or 120.

The computing device 105 may generate initial parameter values for the manufacturing process and provide these values to the additive manufacturing device 110, excitation device 115, and/or detection device 120. The initial parameter values may specify parameters to use to perform the manufacturing process and the monitoring process. In some cases, the initial parameter values may be set based on values (e.g., empirical values) previously determined for a similar application and/or object, and/or provided manually by the user.

The computing device 105 may provide instructions to the devices 110, 115, and 120 to perform specified functions based on the initial parameter values. For example, the computing device 105 may provide instructions to the additive manufacturing device 110 to start the manufacturing process (e.g., start depositing a first layer of material), the excitation device 115 and detection device 120 to evaluate a deposited layer of material, and/or other instructions. In some cases, the initial parameter values may indicate when the devices 110, 115, and/or 120 are to perform the specified functions. In an embodiment, the computing device 105 may provide instructions to the devices 110, 115, and/or 120 that override previously provided instructions. The new instructions may be generated in response to potential problems arising in the manufacturing process, such as a specified temperature not being reached for a curing operation. In this regard, the new instructions may adjust parameter values to be used in the manufacturing process or may terminate the manufacturing process.

In an embodiment, to facilitate in-process monitoring of the manufacturing process, the computing device 105 may determine whether manufacturing characteristics associated with manufacturing operations of the manufacturing process are being satisfied and perform operations accordingly based on the determination. For example, a manufacturing operation may include applying a heating operation (e.g., an annealing operation) on a formed layer (e.g., deposited layer) of material. A manufacturing characteristic of the heating operation may be a temperature that needs to be reached by the heating operation. In this example, when the manufacturing characteristic is determined to be satisfied (e.g., specified temperature is reached), the computing device 105 may allow the manufacturing process to continue as previously specified. However, when the manufacturing characteristic is determined to not be satisfied, the computing device 105 may interrupt the manufacturing process and perform actions to address the situation.

When the manufacturing characteristic is determined to not be satisfied, the computing device 105 may determine that a potential flaw exists and perform additional analysis to verify the flaw and determine regions/portions of the formed layer that exhibit the flaw. Depending on the application and situation, in some cases, the computing device 105 may adjust the manufacturing process to allow repair of the deposited layer or specific regions/portions thereof. In other cases, the computing device 105 may end the manufacturing process. In some cases, the computing device 105 may request and/or receive input from the user regarding whether to or how to proceed.

In an embodiment, the computing device 105 may control one or more imaging devices, such as visible-light or infrared cameras, that may be utilized to capture images or provide a video feed of the deposition material to the user. The imaging devices may be of any physical size, spectral bandwidth, and/or resolution as appropriate to facilitate monitoring of the manufacturing process. Some or all of the imaging devices may be separate from the computing device 105.

In some cases, the imaging devices may be utilized to capture image and/or video data (e.g., visible-light, infrared, and/or other wavelengths) throughout the manufacturing process. For example, the imaging devices may be utilized to capture images or provide a video feed of the object to the user as the layers are deposited to allow real time inspection. In other cases, the imaging device may be utilized primarily when the manufacturing characteristic is determined to not have been satisfied, e.g. to conserve power and resources until a potential problem has been detected. The imaging devices may be calibrated to facilitate dimensional analysis of the object, such as to determine whether a layer of deposited material is of a desired thickness. Information from the imaging devices may be utilized to supplement information from the detection device 120.

The additive manufacturing device 110 includes components utilized to implement the manufacturing process to manufacture the object 125. The additive manufacturing device 110 may include one or more printing nozzles (also referred to as dispense heads) to hold and dispense material to be deposited. In some cases, the additive manufacturing device 110 may include multiple print nozzles, where different printing nozzles may, but need not, hold different material to be deposited. The print nozzle(s) may be movable and/or rotatable to facilitate depositing of material(s) at different locations. The printing nozzles may be swappable, such that a printing nozzle may be removed and replaced with another printing nozzle, e.g. to replace a printing nozzle determined to be defective. The printer nozzle(s) may be lowered when in operation and raised when not in use. In an embodiment, the printing nozzle(s) contains material that includes nanostructures distributed therein to be deposited.

The additive manufacturing device 110 may include a substrate (also referred to as a deposition surface) onto which layers of material may be deposited. In some cases, the substrate may be a separate component from the additive manufacturing device 110 that is useable (e.g., compatible) with the additive manufacturing device 110 to facilitate implementation and possibly monitoring of the manufacturing process (e.g., by repositioning the object 125 to facilitate analysis). The substrate is generally configured to provide support to hold the deposited layers and adapt to changes in the deposition layers (e.g., hardening) throughout the manufacturing process.

In some cases, the substrate may be movable and/or rotatable along at least some dimensions. In other cases, the substrate may be fixed. The substrate may have a heated/heatable surface that can be used to heat the layers of material deposited on the substrate, such as to allow control of a drying time of the deposited layers. The temperature used to heat the deposition material may be adjustable. The substrate may have a vacuum surface. The vacuum surface may be used to apply a vacuum suction to the layers of material deposited on the substrate to hold the layers in place during the manufacturing process.

The additive manufacturing device 110 may implement the manufacturing process based on the initial parameter values and/or other instructions from the computing device 105. By way of non-limiting example, the initial parameter values for the additive manufacturing device 110 may identify (e.g., specify) material(s) for the nanostructures (e.g., quantum dots, shells, and dopants), material(s) to be used for each layer, number and dimensions (e.g., length, width, and/or thickness) of each layer, start and/or end time for forming each layer, manufacturing operations (e.g., heating operations, curing operations) to be performed on each layer and associated characteristics (e.g., pressure, temperature, pH level), and/or other parameters. In addition, the initial parameter values for the additive manufacturing device 110 may identify characteristics to operate specific components of the additive manufacturing device 110, such as flow rate of material deposited by the printing nozzle, temperature of the printing nozzle, temperature of the substrate, pressure applied to the substrate, vertical distance between a dispense tip of the printer nozzle and the substrate, and/or other parameters. For example, when the manufacturing begins, the additive manufacturing device 110 may release a material from the printing nozzle(s) at a flow rate and a temperature specified by the initial parameter values.

The excitation device 115 may apply an excitation signal to a layer(s) of deposited material. The excitation device 115 may be, or may include, one or more light sources, such as laser light sources, that can apply an optical signal to the layer(s) of deposited material. The excitation signal may be EM radiation at a specified wavelength. By way of non-limiting example, the initial parameters for the excitation device 115 may include a wavelength or wavelength range of the excitation signal and a position/orientation of the excitation device 115 (e.g., relative to the deposited material).

The detection device 120 may receive (e.g., detect) a signal emitted by the layer(s) of deposited material in response to the excitation signal from the excitation device 115. The emitted signal may be a feedback EM radiation. In some embodiments, the emitted signal received by the detection device 120 may be emissions from the nanostructures distributed in the layer(s) of deposited material in response to the excitation signal from the excitation device 115. By way of non-limiting example, the initial parameter values for the detection device 120 may include a wavelength or wavelength range of the emitted signal from the nanostructures (e.g., from quantum dots and/or shells) and a position/orientation of the detection device 120 relative to the deposited material. In this regard, the detection device 120 may be configured (e.g., calibrated) to be sensitive to a range of fluorescent excitation emitted by the nanostructures (e.g., quantum dots, shells). The emitted signal may have wavelengths in the visible light region, infrared region, UV region, and/or generally any wavelength suitable for detection. The detection device 120 may be an optical device for detecting light of certain wavelengths, a boroscope designed for sensitivity to wavelengths of light in an appropriate range, a spectroscopy device, a photo-spectroscopy device, a combination thereof, and/or any other device known or available in the art for detecting wavelengths of light or signals emitted by the quantum dots and/or shells.

In some cases, the detection device 120 may include a processor for processing data regarding emissions by the nanostructures gathered by the detection device 120 and a memory for storing the data. Alternatively or in addition, in some cases, the detection device 120 may also include a network device for transmitting data, such as data regarding wavelengths emitted by the nanostructures, over a network to a remote computing device (e.g., the computing device 105) for processing. In this regard, the computing device 105 and/or the detection device 120 may be utilized to determine information about the emitted signal, such as locations from which the emitted signal is received, wavelength components contained in the emitted signal, intensities associated with the wavelength components, and/or any additional information regarding the emitted signal. The information may be presented in the form of an intensity mapping that identifies locations on the layer(s) of deposited material and associated intensity levels for the wavelength components emitted from the identified locations.

To facilitate efficiency of implementing the manufacturing process, the devices 105, 110, 115, and 120 may adjust the initial parameter values as needed to accommodate for slight variations in conditions due to ambient temperature and/or pressure. For example, the initial parameter values may specify the ambient temperature and/or pressure dependence for which the various initial parameter values were computed. The initial parameter values may be adjusted accordingly in response to the actual ambient temperature and/or pressure or variations therein at the time of the manufacturing process. For example, the additive manufacturing device 110 may autonomously and adaptively adjust flow rates of the printing nozzles as the ambient temperature and/or pressure changes throughout the manufacturing process.

Figure 2:
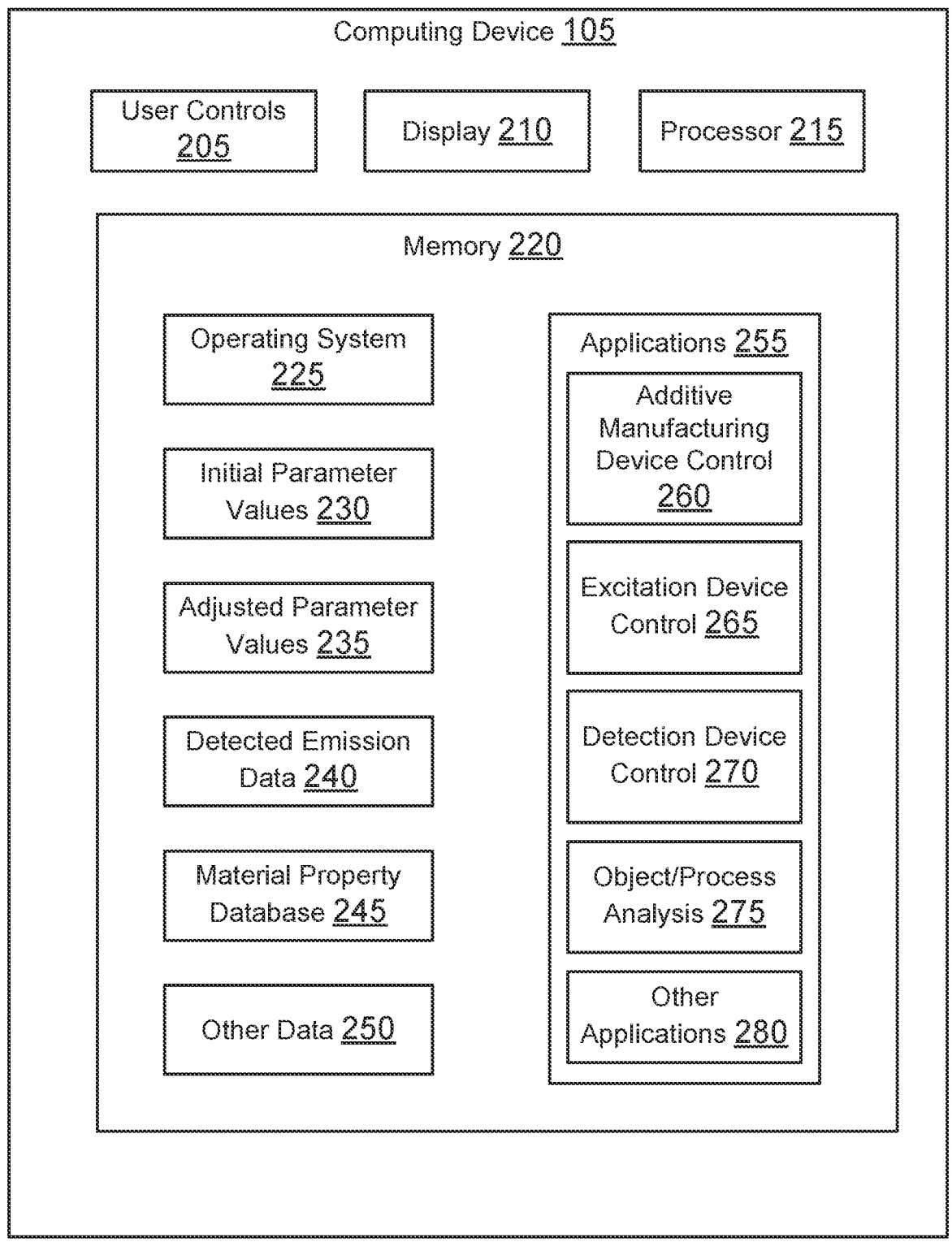
FIG. 2 illustrates a block diagram of a computing device for monitoring a manufacturing process in accordance with an embodiment of the present disclosure.

FIG. 2 illustrates block diagram of the computing device 105 for facilitating a manufacturing process and monitoring (e.g., evaluating) the manufacturing process in accordance with an embodiment of the present disclosure. Although a variety of components are illustrated in FIG. 2, additional, fewer, and/or different components may be provided as appropriate in various embodiments. As shown in FIG. 1, the computing device 105 may be utilized with the additive manufacturing device 110, excitation device 115, and detection device 120.

The computing device 105 includes user controls 205, a display 210, a processor 215, and a memory 220. The user controls 205 may include buttons, switches, and/or dials that can be used to set or adjust various settings and/or parameters, e.g. by pushing buttons, flipping switches, and/or turning dials. In some cases, the user controls 205 may include a keyboard, virtual keyboard, touch screen, mouse, and/or other input device or capability coupled to and/or provided by the computing device 105 to allow user input to the computing device 105.

The display 210 may include a flat screen display or a touch screen display. The display 210 may be utilized to display information associated with the manufacturing process to the user. For example, the computing device 105 may receive information from the detection device 120 and/or derive information based on information received from the detection device 120 regarding the emitted signal detected by the detection device 120, such as presence of different wavelength components, intensity levels of different wavelength components, and/or locations of the deposited material from which the various wavelength component are emitted. The computing device 105 may provide such information for display to the user via the display 210, such as upon request by the user. In some cases, prompts may be displayed to the user to request user input, such as requesting instructions on whether to proceed with a manufacturing process. Alternatively or in addition, the computing device 105 may transmit the information to a user device (e.g., mobile phone) to be displayed by the user device. The information may be transmitted in a short message service (SMS) text message and/or an email for example.

In some cases, the user controls 205 may be integrated with and may also be a part of the display 210. For example, the display 210 may be a touch screen display on which a user interface including the user controls 205 may be presented and used by the user. The user may adjust various settings and/or parameters by touching the user interface monitor set or adjust various settings and/or parameters, and/or otherwise controlling the manufacturing process and/or monitoring of the manufacturing process. In other cases, the user controls 205 may be a separate component from the display 210.

The processor 215 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), codecs, and/or other processing devices.

In some embodiments, the processor 215 may execute machine readable instructions (e.g., software, firmware, or other instructions) stored in the memory 220. In this regard, the processor 215 may perform any of the various operations, processes, and techniques described herein. For example, in some embodiments, the various processes and subsystems described herein (e.g., additive manufacturing device control application 260, detection device control application 270) may be effectively implemented by the processor 215 executing appropriate instructions. In other embodiments, the processor 215 may be replaced and/or supplemented with dedicated hardware components to perform any desired combination of the various techniques described herein.

The memory 220 may be implemented as a machine readable medium storing various machine readable instructions and data. For example, in some embodiments, the memory 220 may store an operating system 225 and applications 255 as machine readable instructions that may be read and executed by the processor 215 to perform the various techniques described herein. The memory 220 may also store data used by the operating system 225 and/or applications 255. In an embodiment, the memory 220 may be implemented as non-volatile memory (e.g., flash memory, hard drive, solid state drive, or other non-transitory machine readable mediums), volatile memory (e.g., random access memory), or combinations thereof.

In FIG. 2, the memory 220 stores initial parameter values 230. The initial parameter values 230 may be provided to the additive manufacturing device 110 to implement an associated manufacturing process. The memory 220 adjusted parameter values 235. The adjusted parameter values 235 may include adjustments made to the initial parameter values 230 and/or adjustments made to previously adjusted parameter values (e.g., multiple adjustments to the same parameter). In some cases, the adjusted parameter values 235 may also include a change history that identifies any changes made to the initial parameter values 230 and any further changes to the adjusted parameter values, such as to allow the adjustments to be analyzed to facilitate the generation and implementation of future manufacturing and/or associated monitoring processes.

The memory 220 stores detected emission data 240. The emission data 240 may be obtained from the detection device 120 and/or derived from information obtained from the detection device 120. The emission data 240 may include an intensity mapping that provides presence of different wavelength components, intensity levels of different wavelength components, and/or locations of the deposited material from which the various wavelength component are emitted.

The memory 220 stores a material property database 245. The material property database 245 may be a compilation of information from materials handbooks. The information may include material properties, such as composition, specific heat, density, band gap, melting/freezing point, condensation/vaporization point, and/or other information for various materials. The information may be used as reference by the user and/or one or more of the applications 255 to facilitate selection of the materials to be used to form the object 125 and/or the nanostructures and/or perform computations based on material properties. The memory 220 may store the materials handbooks themselves and/or may store information (e.g., links, access information, etc.) to access the materials handbooks (e.g., online or cloud sources).

Other data 250 may include any information that may be utilized to define, coordinate, and/or adjust the manufacturing process and associated monitoring process (e.g., evaluating process) as appropriate. For example, other data 250 may include image and/or video data (e.g., visible-light, infrared, and/or other wavelength) taken during the manufacturing process. The image/video data may be processed to determine a smoothness/roughness of different portions of the deposited layer(s), dimensions of the deposited layer(s), a temperature associated with different portions of the deposited layer(s), and/or other characteristics of the object.

The applications 255 may include applications for facilitating implementation of a manufacturing process and/or monitoring of the manufacturing process, and/or adjustments to these processes. In FIG. 2, the applications 255 include an additive manufacturing device control application 260, an excitation device control application 265, a detection device control application 270, an object/process analysis application 275, and other applications 280 that are not necessarily provided herein. In some cases, the applications 255 may be executed by the processor 215 of the computing device 105.

The processor 215 may utilize the additive manufacturing device control application 260 to provide commands to the additive manufacturing device 110 or components thereof (e.g., substrate, printing nozzle). The additive manufacturing device control application 260 may implement the manufacturing process based on the initial parameter values 230 and/or adjusted parameter values 235. The additive manufacturing device control application 260 may generate commands to pause or end the manufacturing process in response to user input or an error being detected (e.g., a manufacturing characteristic not having been satisfied). In some cases, the commands may be generated in response to user input (e.g., commands received from the user via the user controls 205). In other cases, the commands may be automated commands generated by the additive manufacturing device control application 260.

The processor 215 may utilize the excitation device control application 265 to control operation of the excitation device 115. The excitation device control application 265 may set the excitation wavelength, location(s) of the deposited layer(s) of material at which to apply the excitation signal(s), and/or placement and/or orientation (e.g., angle at which transmitter of excitation signal is pointed) of the excitation device 115. In some cases, the excitation device control application 265 may control movement and/or orientation of the excitation device 115, such as to apply an excitation signal to different portions of the deposited layer(s) of material. The processor 215 may utilize the detection device control application 270 to control operation of the detection device 120. The detection device control application 270 may identify the wavelength(s) to detect, and/or placement and/or orientation of the detection device 120 to facilitate detection of the emitted signal. In some cases, the detection device control application 270 may operate in tandem with the excitation device control application 265 to control movement and/or orientation of the detection device 120, such as to receive the emitted signal in response to excitation signals applied to different portions of the deposited layer(s) of material.

The processor 215 may utilize the object/process analysis application 275 to monitor a manufacturing process (e.g., in real time) and/or analyze a previously performed manufacturing process. The object/process analysis application 275 may utilize the initial parameter values 230, adjusted parameter values 235, detected emission data, material property database 245, and/or other data 250 (e.g., image/video data) to determine properties of the object being formed. For example, the object/process analysis application 275 may be utilized to obtain information associated with the manufacturing and/or monitoring processes and/or determine how or whether to adjust the manufacturing and/or monitoring processes, such as in response to an error being detected (e.g., a manufacturing characteristic not having been satisfied). The object/process analysis application 275 may also be utilized to analyze successful and failed manufacturing processes to facilitate generation of future manufacturing and/or monitoring processes.

Other applications 280 may include any other application to facilitate defining and/or implementing the manufacturing and/or monitoring processes. The other applications 280 may include, for example, an imaging application. The imaging application may be utilized to capture and process image and/or video data associated with the manufacturing process. The data may be utilized to visually inspect the object during the manufacturing process and/or in response to an error being detected.

Figure 3:
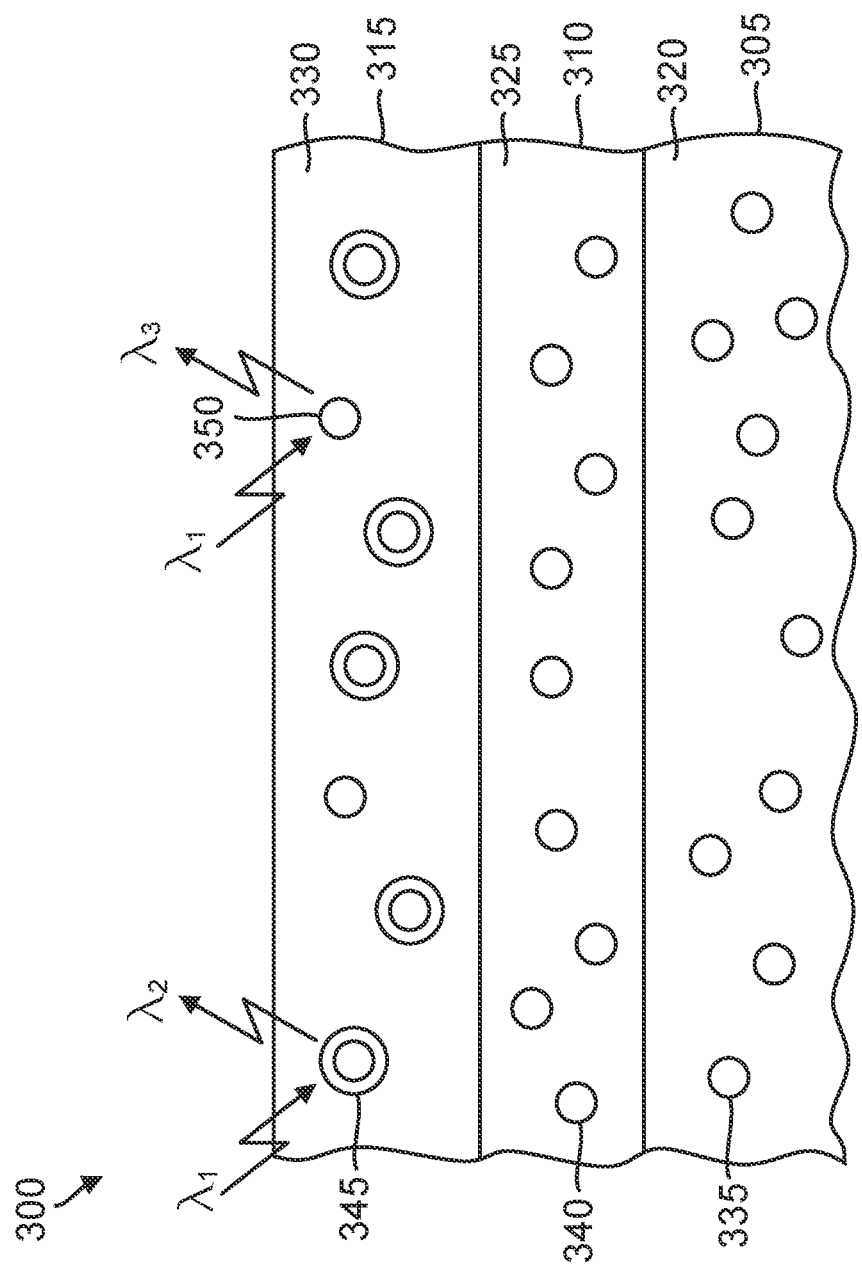
FIG. 3 illustrates nanostructures in layers of an object in accordance with an embodiment of the present disclosure.

FIG. 3 illustrates nanostructures in layers of an object 300 in accordance with an embodiment of the present disclosure. In an embodiment, the object 300 may be formed using the system 100 of FIG. 1. As part of a manufacturing process, layers 305 and 310 have been formed. A layer 315 is formed over the layers 305 and 310. For example, the additive manufacturing device 110 may deposit the layer 315 over the layers 305 and 310. The layers 305, 310, and 315 include a material 320, 325, and 330, respectively, and nanostructures distributed therein. As an example, a nanostructure 335 in the layer 305, a nanostructure 340 in the layer 310, and nanostructures 345 and 350 in the layer 315 are explicitly labeled in FIG. 3. The material 320, 325, and 330 may be referred to as a bulk material of their respective layers.

As part of the manufacturing process, a manufacturing operation(s) may be performed on the layers that are formed. A manufacturing operation may be associated with one or more manufacturing characteristics to be satisfied. For example, a curing operation applied on the layer 315 may be associated with a specified temperature and/or specified pressure to be reached in order properly cure the layer 315. In various applications, the specified temperature may be a temperature within around 200° F. and 500° F.

An evaluation of the layer 315 may be based on evaluating whether the manufacturing characteristic(s) of the manufacturing operation(s) performed on the layer 315 has been satisfied. In an embodiment, to evaluate the layer 315, an excitation signal of wavelength $\lambda_1$ may be applied to the layer 315, e.g. by the excitation device 115. In response to the excitation signal of wavelength $\lambda_1$, nanostructures (e.g., 345, 350) in the layer 315 may emit a signal. The emitted signal may be detected by the detection device 120 and may have wavelength components $\lambda_2$ and $\lambda_3$. Nanostructures with their shells intact, such as the nanostructure 345, may emit a signal of wavelength $\lambda_2$ in response to the excitation signal. Nanostructures with their shells removed, such as the nanostructure 350, may emit a signal of wavelength $\lambda_3$.

In an embodiment, the nanostructures are configured such that the shells are removed and the quantum dots remain intact when the manufacturing characteristic(s) of the manufacturing operation(s) has been satisfied. The determination of whether the manufacturing characteristic(s) has been satisfied may be performed (e.g., by the computing device 105) after a predetermined amount of time has passed. For example, the predetermined amount of time may be the time determined to be sufficient to complete the manufacturing operation (e.g., curing operation). The determination may be based on a threshold(s) set for the intensity of the $\lambda_2$ and/or $\lambda_3$ components (e.g. set as part of the initial parameter values) of the signal emitted from the layer 315 in response to the applied excitation signal. In this regard, since the shells are configured to be removed when the manufacturing characteristic(s) is satisfied, the quantum dots are exposed to the excitation signal to cause the quantum dots to emit a signal of wavelength $\lambda_3$ when the manufacturing characteristic(s) is satisfied. For instance, the manufacturing characteristic(s) may be considered to have been satisfied when the intensity of the $\lambda_2$ component is below a first threshold and when the intensity of the $\lambda_3$ component is above a second threshold.

As examples, the manufacturing characteristic(s) is considered to not have been satisfied when the emitted signal from the layer 315 has a $\lambda_2$ component of higher intensity than the first threshold (e.g., a large percentage of the shells have not been removed), when no emitted signal is received (e.g., the quantum dots and shells have been dissolved or otherwise deactivated), and/or otherwise when the emitted signal does not include a $\lambda_3$ component of sufficient intensity.

In an embodiment, an evaluation process may be performed on each layer that is formed. In FIG. 3, prior to forming the layer 315, the layer 305 and/or 310 may have been evaluated using a similar evaluation process. In this regard, the nanostructures (e.g., 335, 340) of the layers 305 and 310 are depicted as having only the quantum dots intact, e.g. the shells have been removed by a manufacturing operation(s). In another embodiment, an evaluation process is not performed for each layer that is formed.

Figure 4:
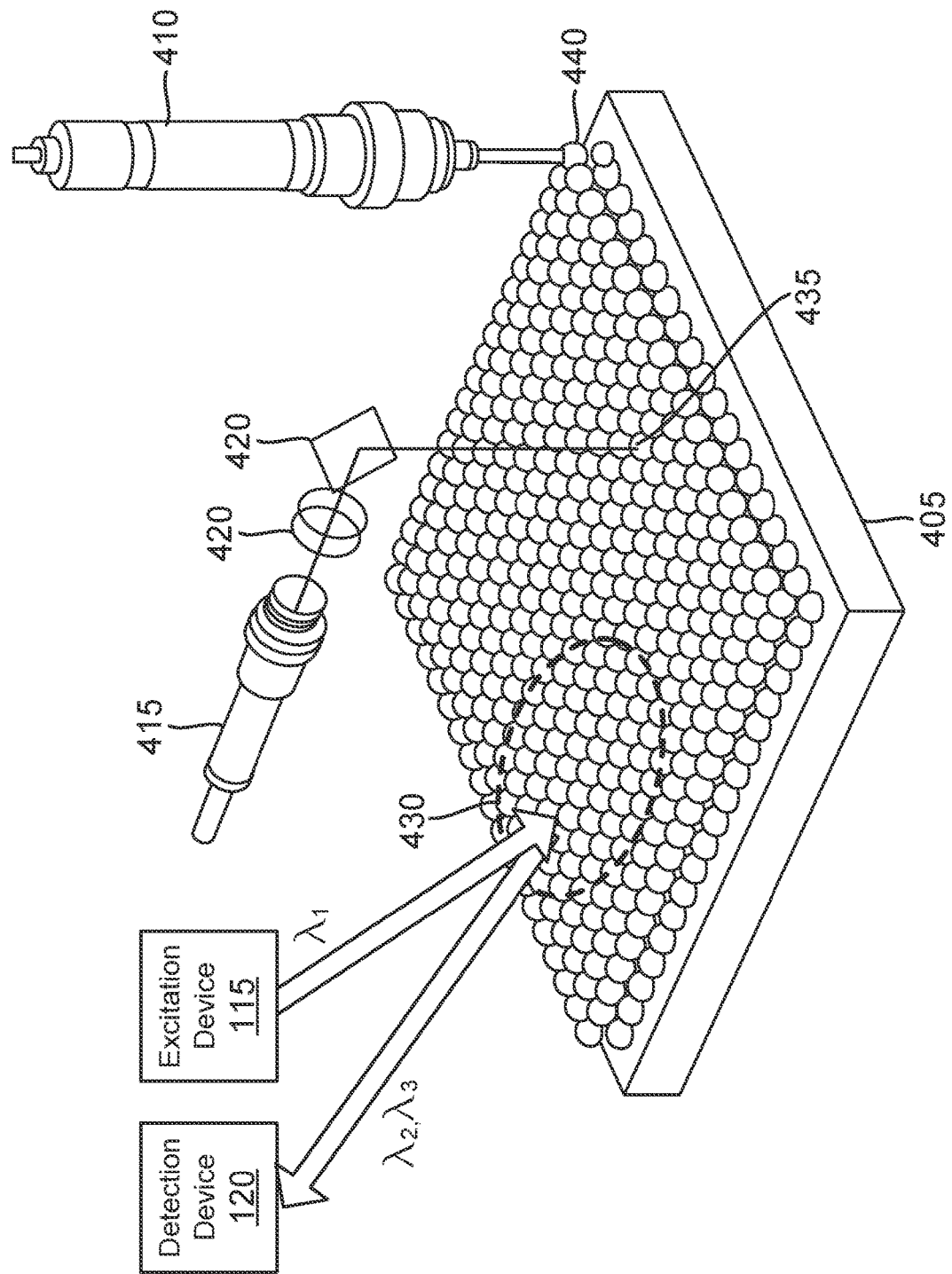
FIG. 4 illustrates forming of a layer of an object and evaluating the layer in accordance with an embodiment of the present disclosure.

FIG. 4 illustrates forming of a layer of an object and evaluating the layer in accordance with an embodiment of the present disclosure. In an embodiment, the layer of the object is formed using the system 100 of FIG. 1. In this embodiment, the additive manufacturing device 110 may include a substrate 405 and printing nozzle 410. In some cases, the additive manufacturing device 110 may include additional components, such as additional printing nozzles and/or control circuitry. For example, additional printing nozzles may allow faster depositing of the layer(s) of material and/or depositing of different materials within a layer or in different layers (e.g., different printing nozzles deposit different materials). The control circuitry may generate signals to control the operation of the additive manufacturing device 110 and may be based on initial parameter values and/or instructions from the computing device 105. Control signals may be utilized to control flow rate and/or temperature of the printing nozzle 410, temperature and/or pressure applied to the substrate 405, adjustment in position and/or orientation of the substrate 405 and/or printing nozzle 410, and/or other aspects associated with the additive manufacturing device 110. The printing nozzle 410 forms the layer by depositing (e.g., printing) portions of the layer, where each portion is represented as a sphere in FIG. 4. In general, to facilitate evaluating the layer, each portion may include the deposition material and nanostructures distributed therein.

In an embodiment, a manufacturing operation is performed on deposited portions of the layer. For example, in FIG. 4, a laser 415 and optical elements 420 (e.g., lenses, mirrors) can be utilized to perform a curing operation (e.g., laser curing operation). The laser 415 transmits a laser with a wavelength appropriate for the curing operation (e.g., UV wavelength for UV curing) and the optical elements 420 direct the laser to a previously formed portion 435 of the layer to be cured. In some cases, operation of the laser 415 and optical elements 420 may be specified by the computing device 105 (e.g., in the initial parameter values). In some cases, the laser 415 and/or the optical elements 420 may be movable and/or rotatable to allow different portions of the layer to be cured using the laser 415 and the optical elements 420. Alternatively or in addition, additional lasers and/or optical elements may be utilized to cure different portions of the layer.

To evaluate portions of the layer, the excitation device 115 applies an excitation signal to the portions of the layer and the detection device 120 detects an emitted signal from these excited portions. For example, in FIG. 4, the excitation device 115 applies an excitation signal to a portion 430 of the layer and the detection device 120 detects an emitted signal from the portion 430. The emitted signal is provided by at least a subset of nanostructures distributed in the portion 430 of the layer. The excitation signal may have a wavelength M. In response to the excitation signal of wavelength $\lambda_1$, the emitted signal may have a wavelength $\lambda_2$ (e.g., emitted by nanostructures with at least a portion of their shells intact) and/or a wavelength $\lambda_3$ (e.g., emitted by for nanostructures with at least a portion of their shells removed). The wavelengths $\lambda_2$ and $\lambda_3$ are selected such that the detection device 120 can readily distinguish between a $\lambda_2$ component of the emitted signal from a $\lambda_3$ component of the emitted signal.

As shown in FIG. 4, in some cases, a portion 440 is being formed by the printing nozzle 410 while a previously formed portion (e.g., 430) is being evaluated and another previously formed portion (e.g., 435) is being cured. Since different parts of the manufacturing and monitoring processes are performed in parallel, such an implementation may allow efficient manufacturing of the object. To allow such an implementation, the manufacturing process is designed to avoid interference between forming, curing, and evaluating of respective portions of the layer. For example, to allow simultaneously curing and evaluating the layer, the wavelength(s) associated with the laser curing is selected to not interfere with the wavelength(s) of the excitation signal and the emitted signal, and/or vice versa. When the wavelength(s) may interfere, the laser 415 may be turned off when the excitation signal is applied, and vice versa. In other manufacturing processes, an entire layer may be formed prior to a manufacturing operation and/or evaluation operation being performed.

In some cases, the excitation device 115 may excite multiple portions of the formed layer simultaneously. For example, the excitation device 115 may include and/or may utilize (e.g., control) multiple excitation sources to excite multiple portions of the layer(s) at a time. The detection device 120 may include appropriate sensors to capture to the emitted signals from the excited portions.

Figure 5:
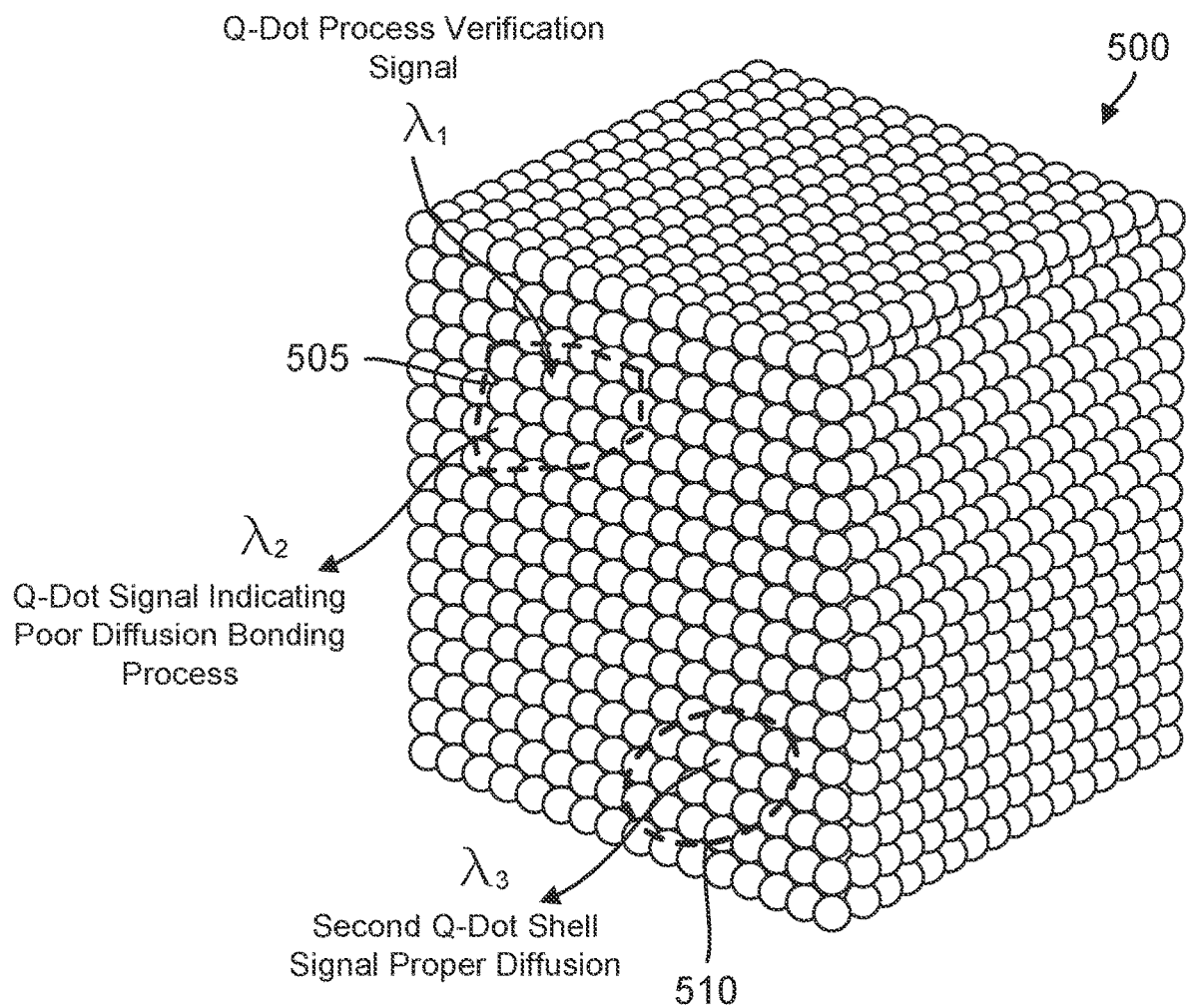
FIG. 5 illustrates different signals emitted by an object in response to an excitation signal in accordance with an embodiment of the present disclosure.

FIG. 5 illustrates different signals emitted by an object 500 in response to an excitation signal in accordance with an embodiment of the present disclosure. The object 500 may be completed or partially completed. The object 500 may be formed by adding one layer on top of another. In FIG. 5, an excitation signal of wavelength $\lambda_1$ are applied to a side of the object 500 (e.g., rather than a top surface of the object 500). In response to the excitation signal, a portion 505 of the object 500 emits a signal of wavelength $\lambda_2$ and a portion 510 of the object 500 emits a signal of wavelength $\lambda_3$. Thus, an evaluation of the object 500 may indicate that a manufacturing characteristic(s) of a manufacturing operation(s) applied to the portion 505 was not satisfied, whereas a manufacturing characteristic(s) of a manufacturing operation(s) applied to the portion 510 was satisfied. For example, an emission with a high intensity of $\lambda_2$ components may indicate a poor diffusion bonding process, whereas an emission with a high intensity of $\lambda_3$ components may indicate a proper diffusion bonding process. In some cases, further analysis of the portions 505 and 510 and/or other portions may be utilized to verify the indication.

In FIG. 5, multiple deposited layers of the object 500 may be evaluated using the excitation signal. Such an excitation may be performed as an alternative to or in addition to evaluating each layer as the layer is formed (e.g., deposited). For example, the excitation may be performed on the completed product, e.g. as a final check on the manufacturing process. Depending on application, in some cases, evaluating only a subset of the deposited layers may expedite the manufacturing of a completed object and save on manufacturing costs (e.g., less time and power consumed).

Figure 6A:
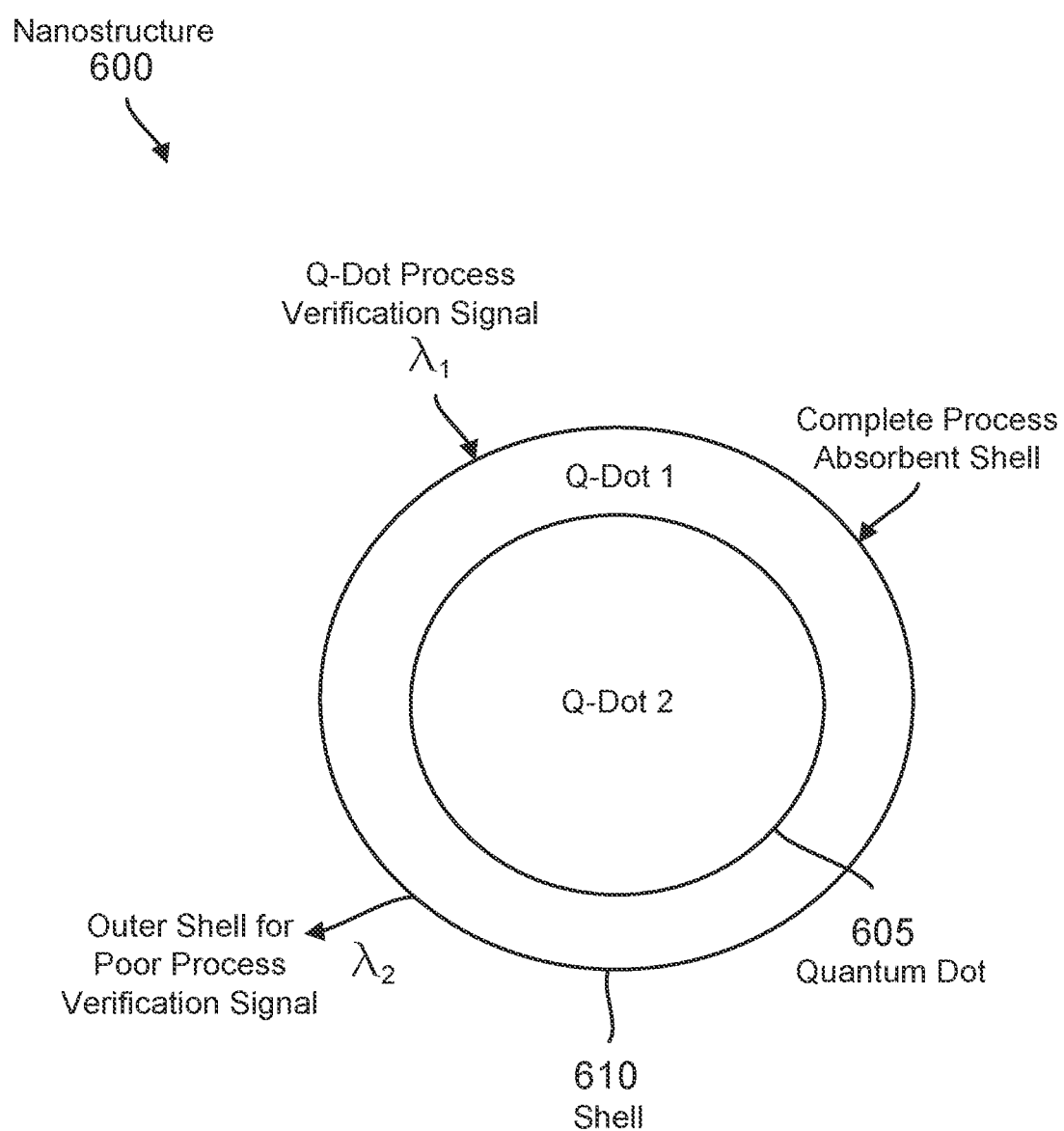
FIG. 6A illustrates an example of a nanostructure in accordance with an embodiment of the present disclosure.

FIG. 6A illustrates an example of a nanostructure 600 in accordance with an embodiment of the present disclosure. The nanostructure 600 includes a quantum dot 605 and a shell 610 encompassing the quantum dot 605. The quantum dot 605 may include silicon, germanium, gallium, arsenide, indium phosphide, cadmium selenide, zinc sulfide, other substances, and/or a combination thereof. The shell 610 may include silicon, cadmium selenide, cadmium sulfide, cadmium telluride, and/or other elemental or compound semiconductors. In an embodiment, the shell 610 may be doped with a metal, such as sodium or tin, or metal alloy.

The quantum dot 605 and the shell 610 may each have a band gap. With the shell 610 intact, when an excitation signal (e.g., EM radiation) associated with energy higher than a band gap of the shell 610 is applied to the shell 610, the excitation signal is absorbed by the shell 610 and a signal is emitted. The emitted signal has a lower energy than the excitation signal. Equivalently, as the emitted signal's wavelength is inversely proportional to the emitted signal's energy, the emitted signal has a larger wavelength than the excitation signal. In FIG. 6A, the wavelength of the excitation signal is represented by $\lambda_1$ and the wavelength of the emitted signal from the shell 610 is represented by $\lambda_2$. When the shell 610 is intact, the quantum dot 605 is not exposed. In an embodiment, when the shell 610 is intact, the quantum dot 605 is blocked from the excitation signal by the shell 610 and/or an emitted signal of the quantum dot 605 (e.g., in response to any portion of the excitation signal received by the quantum dot 605) is blocked by the shell 610.

In an embodiment, nanostructures, such as the nanostructure 600, may be distributed throughout (e.g., impregnated in) a material that is deposited as part of a manufacturing process (e.g., additive manufacturing process). In this embodiment, at various stages of the manufacturing process, the shell 610 of the nanostructure 600 may dissipate, dissolve, or otherwise be removed. For example, the shell 610 may be removed when the shell 610 reaches a certain temperature, pressure, and/or pH level (e.g., in response to a manufacturing operation that is performed). Once the shell 610 is removed, the quantum dot 605 is exposed.

Figure 6B:
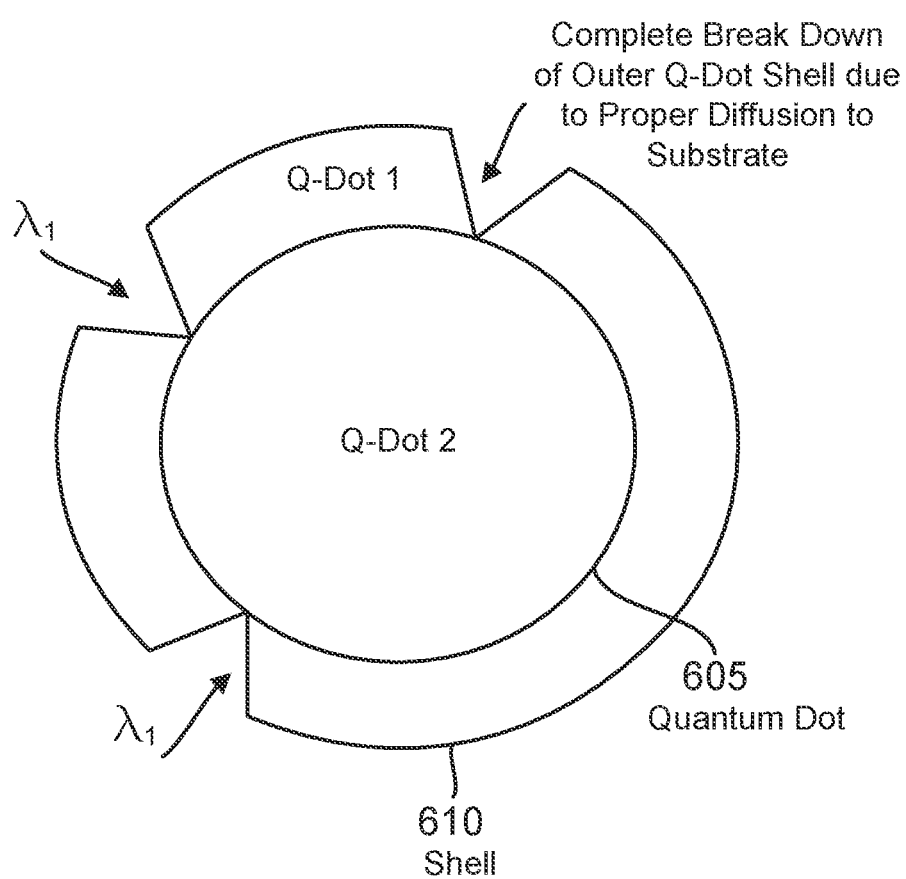
FIG. 6B illustrates an example of the nanostructure of FIG. 6A with the shell partially removed in accordance with an embodiment of the present disclosure.

FIG. 6B illustrates an example of the nanostructure of FIG. 6A with the shell partially removed in accordance with an embodiment of the present disclosure. When the shell is partially removed, remaining portions of the shell 610 may emit a signal of wavelength $\lambda_2$ in response to the excitation signal of wavelength $\lambda_1$ and portions (e.g., exposed portions) of the quantum dot 605 may emit a signal of wavelength $\lambda_3$. In an embodiment, the shell 610 may be partially removed while a manufacturing operation(s) (e.g., heating operation, pressurizing operation, curing operation) is being performed on the nanostructure.

Figure 6C:
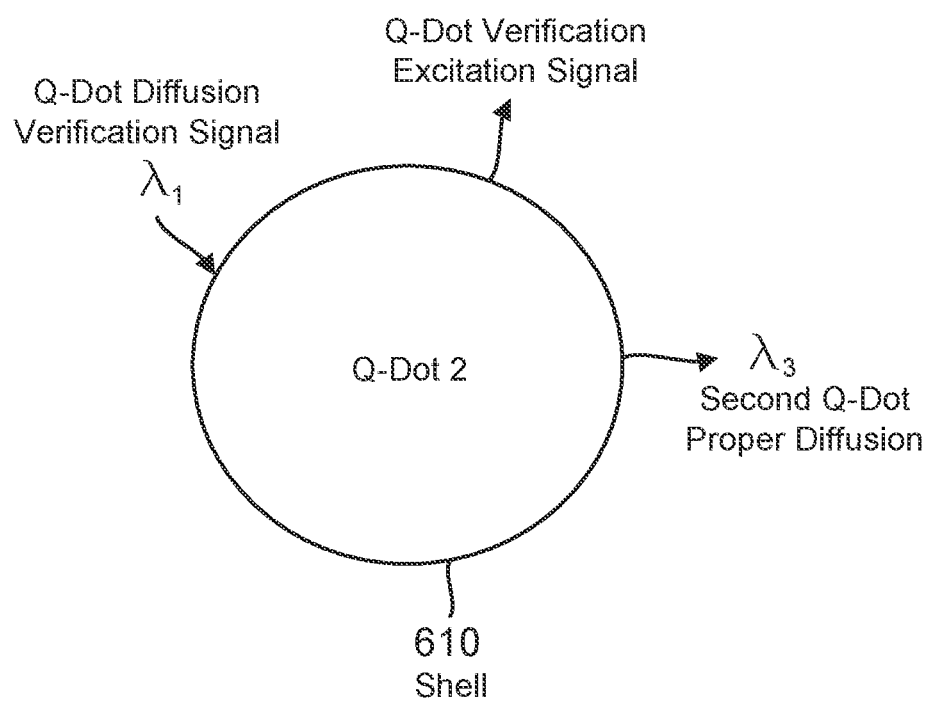
FIG. 6C illustrates an example of the nanostructure of FIG. 6A with the shell completely removed in accordance with an embodiment of the present disclosure.

FIG. 6C illustrates an example of the nanostructure of FIG. 6A with the shell completely removed in accordance with an embodiment of the present disclosure. When the shell is completely removed, the excitation signal of wavelength $\lambda_1$ causes the quantum dot 605 to emit a signal of wavelength $\lambda_3$. In an embodiment, the shell 610 may be completely removed (or mostly completely removed) when the manufacturing characteristic(s) of the manufacturing operation(s) has been satisfied, e.g. the specified temperature of the curing operation has been reached. In this regard, a determination as to whether the manufacturing charactistic(s) has been satisfied may be based at least in part on the presence (or lack of presence) of a signal emitted by the quantum dot 605 and/or a signal emitted by the shell 610.

Quantum dots (also be referred to as semiconductor nanocrystals or semiconductor nanostructures) are tiny crystals that may have sizes on the order of nanometers and may include a few hundred to a few thousands of atoms. For example, a spherical or substantially spherical quantum dot may be less than 100 nanometers in diameter. In some applications, quantum dots may be less than a single nanometer in diameter. By way of non-limiting example, quantum dots may be formed of silicon, germanium, gallium, arsenide, indium phosphide, cadmium selenide, zinc sulfide, other substances, and/or a combination thereof.

The quantum dots may be synthesized using a variety of substances and processes. As one example, colloidally prepared quantum dots are free floating and can be attached to a variety of molecules via metal coordinating functional groups. By way of non-limiting example, these groups include thiol, amine, nitrile, phosphine, phosphine oxide, phosphonic acid, carboxylic acid, or other ligands. The ability to attach to other molecules greatly increases the flexibility of quantum dots with respect to the types of environments in which they can be applied.

The shells may be deposited on the quantum dots. In some cases, the shells may be deposited using vapor deposition, direct deposition, and/or other deposition techniques to coat the quantum dots. By way of non-limiting example, the shells may include silicon, cadmium selenide (CdSe), cadmium sulfide (CdS), cadmium telluride (CdTe), and/or other elemental or compound semiconductors. In an embodiment, the shells may be doped with a metal, such as sodium (Na) or tin (Sn), or metal alloy. The shell material and the dopants may form covalent bonds. The shells may be implemented using any known or available methods or processes for manufacturing, producing, or generating the shells, so long as the coating of the quantum dots by the shells do not adversely affect the quantum dots. In this regard, properties of the shells (e.g., material properties) and the deposition process for the shells are selected such that deposition of the shells does not dissolve or otherwise neutralize the quantum dots. For example, the quantum dots may be neutralized when a reaction between the quantum dots and their shells cause the quantum dot to be unable to fluoresce.

In an embodiment, the quantum dots and shells of the nanostructures may be implemented as any type of quantum dots and shells, respectively. In this regard, the quantum dots and shells may be manufactured using any known or available methods or processes for manufacturing, producing, or generating quantum dots and shells. In this example, the nanostructures are incorporated into (e.g., mixed into, embedded in) a material. In many cases, the nanostructures are incorporated into the material prior to deposition, such that the deposition (e.g., by one or more printing nozzles) causes the material with the nanostructures distributed therein to be deposited. The nanostructures are incorporated into the material using any known or available method for incorporating nanostructures into a material. Any technique known to a person of ordinary skill in the art may be utilized.

In an embodiment, nanostructures of multiple sizes, shapes, and/or materials can be tethered or linked together to form molecules, attached to a polymer backbone, linked or tethered to form chains, and/or linked to form lattices. The nanostructures in these chains and lattices that are of different size, shape, and/or material emit different wavelength signals in different patterns. The nanostructures of multiple sizes, shapes, and/or materials may be mixed together and deposited with the deposition material and linked (e.g., by using various manufacturing operations such as curing operations). In response to an excitation signal, the linked nanostructures may provide a specific identifiable code pattern, which may be multicolored (e.g., having multiple wavelength components) and can be identified by a unique nanostructure pattern, similar to a bar code. Thus, a nanostructure bar code with specific fluoroscopic characteristics may be selectively or uniformly embedded into the deposition material. In this regard, when the quantum dots are of multiple sizes, shapes, and/or materials and shells are of multiple sizes, shapes, and/or materials, the linked nanostructures may provide a specific identifiable code pattern when the shells are intact and another specific identifiable code pattern when the quantum dots are intact. In an embodiment, the code patterns may be utilized for monitoring of the manufacturing process, such as in determining whether manufacturing characteristics have been satisfied.

Figure 7:
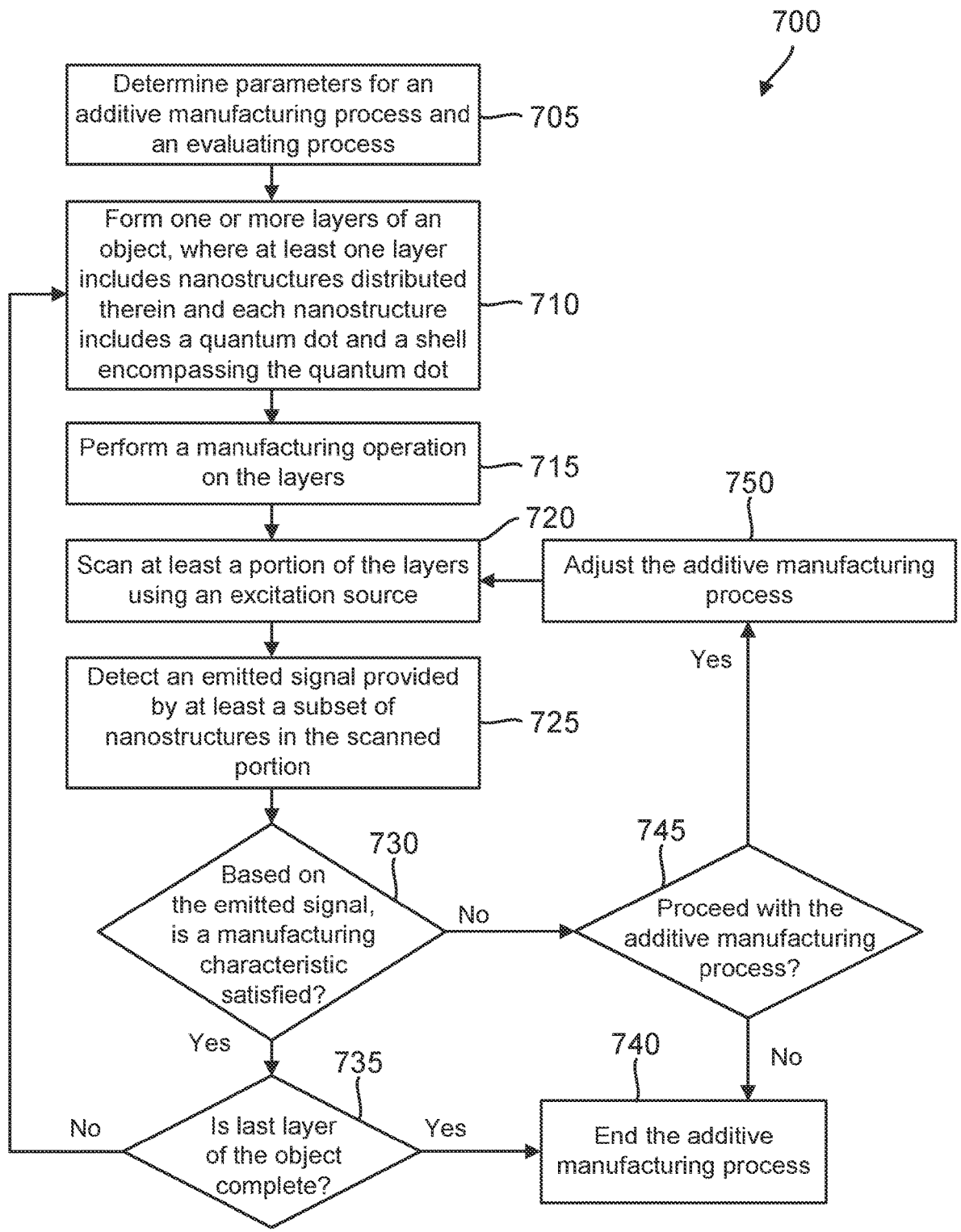
FIG. 7 illustrates a flow diagram of an example process for using nanostructures to monitor a manufacturing process in accordance with an embodiment of the present disclosure.

FIG. 7 illustrates a flow diagram of an example process 700 for using nanostructures to monitor a manufacturing process in accordance with an embodiment of the present disclosure. For explanatory purposes, the example process 700 is described herein with reference to the system 100 shown in FIG. 1; however, the example process 700 is not limited to the system 100 of FIG. 1. Note that one or more operations may be combined, omitted, and/or performed in a different order as desired.

At block 705, the computing device 105 determines parameters for a manufacturing process (e.g., an additive manufacturing process) and an associated monitoring (e.g., evaluating) process. The determined parameters may be provided to the additive manufacturing device 110, excitation device 115, and detection device 120. The parameters may include material(s) for the nanostructures (e.g., quantum dots, shells, and dopants), amount of nanostructures to be incorporated into deposited material(s), excitation signal wavelength or wavelength range, emitted signal wavelength or wavelength range, number and dimensions of layers of deposited material, material(s) to be deposited in each layer, printer nozzle flow rate and/or temperature, manufacturing operations and associated manufacturing characteristics, and/or other parameters associated with the manufacturing process or the monitoring process. In some cases, the determined parameters may be stored as the initial parameter values 230 in the memory 220 of the computing device 105.

At block 710, the additive manufacturing device 110 forms one or more layers of an object, in which at least one of the layer(s) includes nanostructures distributed therein. Each nanostructure (e.g., 600) may include a quantum dot (e.g., 605) and a shell (e.g., 610) encompassing the quantum dot. The shell may be doped. The quantum dot and its encompassing shell generally include different materials and exhibit different properties, such as different melting points and band gaps. In an embodiment, not all of the deposited layers are evaluated. In some cases, the deposited layers that are not evaluated do not have nanostructures distributed therein. In other cases, these deposited layers may have nanostructures distributed therein. For example, in these latter cases, the cost (e.g., time cost, component cost) and/or complexity associated with distributing nanostructures in the deposited material of some layers and not in other layers may be higher than distributing nanostructures in all deposited layers of material.

At block 715, the additive manufacturing device 110 performs a manufacturing operation on the layer(s). The manufacturing operation may have an associated manufacturing characteristic. In an embodiment, the quantum dots and the shells of the nanostructures may be configured such that the shells are removed (e.g., melted, dissipated) when the manufacturing operation is properly performed (e.g., while generally leaving the quantum dots intact). The manufacturing operation may be considered to be properly performed when a manufacturing characteristic has been satisfied. In this regard, the shells being removed (while the quantum dots are intact) may be indicative of the manufacturing characteristic having been satisfied.

As an example, the manufacturing operation may include heating the layer(s) of material at a specified temperature (e.g., for at least a minimum amount of time), in which the heating may cause the shells of the nanostructures to be removed (e.g., melted, dissipated). The manufacturing characteristic is satisfied when the specified temperature is reached. In this example, various parameters (e.g., material(s), size(s), shape(s)) of the shells and the quantum dots may be selected such that, when the heating reaches the specified temperature, the melting point of the shell has been reached (e.g., to cause removal of the shells) whereas the melting point of the quantum dots has not been reached (e.g., to leave the quantum dots intact).

As another example, the manufacturing operation may include applying a pressure to the layer(s) of material (e.g., for at least a minimum amount of time). The manufacturing characteristic is satisfied when the pressure is reached. The shells may be configured to be removed and the quantum dots configured to remain mostly intact when the pressure has been reached at the layer(s) of material. As another example, the manufacturing operation may be, may include, or may be a part of, a curing operation in which the layer(s) of material is maintained at a specified temperature and a specified pressure. The shells may be configured to be removed and the quantum dots configured to remain mostly intact after the layer(s) of material is maintained at the specified temperature and/or the specified pressure for at least a minimum amount of time.

At block 720, the excitation device 115 scans at least a portion of the layer(s) using an excitation signal. For example, the excitation device 115 may apply an excitation signal (e.g., EM radiation) having a wavelength $\lambda_1$ to the portion of the layer(s). In some cases, the excitation device 115 scans an entirety of the layer(s) (e.g., at least one of the layers). The excitation device 115 may scan the entirety of the layer(s) using one or more excitation signals having wavelength $\lambda_1$. The excitation device 115 may include and/or may utilize multiple excitation sources to scan multiple portions of the layer(s) at a time. In some cases, the excitation device 115 may move and/or rotate an excitation source(s) to scan different portions of the layer(s).

At block 725, the detection device 120 detects an emitted signal provided by at least a subset of the nanostructures distributed in the portion of the layer(s). The emitted signal may include EM radiation having a wavelength $\lambda_2$ from the shells of the nanostructures and/or EM radiation having a wavelength $\lambda_3$ from the quantum dots of the nanostructures (e.g., when the corresponding shells are at least partially removed). In an embodiment, the wavelengths $\lambda_2$ and $\lambda_3$ are selected to be sufficiently separated in wavelength such that the detection device 120 can accurately determine how much of the emitted signal can be attributed to emissions from the shells and how much from the quantum dots.

In some cases, blocks 715, 720, and 725 may be performed in parallel. In this regard, the emitted signal may be utilized as a gauge of whether the manufacturing operation is complete. For example, a curing operation can be considered to be complete when the emitted signal from the nanostructures in the deposited material includes the $\lambda_3$ component from the quantum dots and negligible or no $\lambda_2$ component from the shells (e.g., the shells have been removed).

At block 730, the computing device 105 determines whether a manufacturing characteristic has been satisfied based on the emitted signal. The manufacturing characteristic is associated with the manufacturing operation performed on the layer(s) of material at block 715. The determination may be made after an amount of time (e.g., an amount of time specified in the initial parameter values) for the manufacturing operation has elapsed. The computing device 105 may receive information associated with the emitted signal from the detection device 120 and/or derive the information based on information received from the detection device 120. The information may identify the presence (or lack of presence) of the $\lambda_2$ component (e.g., associated with the shells) and/or $\lambda_3$ component (e.g., associated with the quantum dots), intensities of these components, and/or locations of the layer(s) from which these signal components are received.

As indicated previously, the shells may be configured to be removed while the quantum dots remain intact when the manufacturing characteristic has been satisfied. As one example, the computing device 105 may determine the manufacturing characteristic has been satisfied based on the presence of the $\lambda_3$ component in the emitted signal and lack of presence of the $\lambda_2$ component in the emitted signal. As another example, the computing device 105 may determine the manufacturing characteristic has been satisfied when the emitted signal has a high intensity for the $\lambda_3$ component (e.g., associated with the quantum dots) and a low intensity (or no intensity) for the $\lambda_2$ component (e.g., associated with the shells). In this example, a threshold(s) may be set (e.g., in the initial parameter values) for the intensity of the $\lambda_2$ and/or $\lambda_3$ components. For instance, the computing device 105 may determine the manufacturing characteristic has been satisfied when the intensity of the $\lambda_2$ component is below a first threshold and when the intensity of the $\lambda_3$ component is above a second threshold.

When the manufacturing characteristic is determined to have been satisfied, a determination is made as to whether a last layer of the object has been completed at block 735. When the last layer of the object has been completed, the additive manufacturing process ends at block 740. When there are additional layer(s) of the object to be deposited, the process 700 proceeds to block 710, such that the additional layer(s) may be formed to obtain the completed object.

When the manufacturing characteristic is determined to not have been satisfied, at block 745, the computing device 105 determines whether to proceed with the manufacturing process. The computing device 105 may interrupt the manufacturing process while making the determination. In some cases, the computing device 105 may be provided autonomously (e.g., set by user as part of the initial parameter values) to determine whether to proceed with the manufacturing process. In other cases, the determination of whether to proceed with the manufacturing process may be based on an explicit instruction from the user.

For example, the computing device 105 may provide for display the manufacturing characteristic that has not been satisfied and any associated information (e.g., wavelength components and associated intensity levels at different locations of the layer(s)) to the user, and a prompt to the user regarding whether to proceed with the manufacturing process and/or how to adjust the manufacturing process. In some cases, the computing device may provide for display to the user proposed adjustments to parameter values of the manufacturing process, and a prompt requesting the user to authorize, not authorize, and/or manually set the parameter values. In these cases, the user can authorize the proposed adjustments, end the manufacturing process (e.g., discard the formed portions of the object), or manually set the parameter values.

The computing device 105 may provide any such information and/or prompts to the user via the display 210 of the computing device 105. In some cases, such as when the user is remote from the computing device 105, the computing device 105 may transmit (e.g., wirelessly transmit) messages to the user, such as an SMS text message and/or an email with an indication that the manufacturing characteristic has been determined to not be satisfied, and a prompt requesting the user for authorization to proceed with performing actions to adjust the additive manufacturing process.

In an embodiment, when the manufacturing characteristic is determined to not have been satisfied, the computing device 105 may obtain (e.g., determine) additional information associated with the manufacturing process and/or the object being manufactured by the manufacturing process. The additional information may be utilized to verify that the manufacturing characteristic has not been satisfied, determine the proposed adjustments to be provided to the user, and/or otherwise allow the computing device 105 to autonomously determine whether to proceed with the manufacturing process (e.g., with adjustments) or better inform the user. In this regard, since the manufacturing characteristic not having been satisfied may cause a defective final product, costs associated with obtaining the information and determining whether to proceed with the manufacturing process (e.g., with or without adjusted parameter values) may be lower than ending the current manufacturing process, discarding the formed portions of the object, and starting with a new manufacturing process.

For example, the computing device 105 may transmit commands to the detection device 120 to scan the deposited layer(s) to generate an intensity mapping. In some cases, the portion of the layer(s) may be scanned more extensively than the scan performed at block 720. The intensity mapping may identify the wavelength components in the emitted signal, their respective intensity levels, and/or other information at various locations of the formed layer(s). Based on the intensity mapping, the computing device 105 may determine areas and/or volumes associated with poor diffusion or polymer coupling, which are generally areas and/or volumes in which the intensity of $\lambda_2$ component is above a threshold and/or intensity of $\lambda_3$ component is below a threshold. For example, the manufacturing operation may be a curing operation that caused some portions to be cured properly while other portions were insufficiently cured.

Alternatively or in addition, the computing device 105 may transmit commands to one or more imaging devices to capture image and/or video data associated with the object formed in the manufacturing process. The captured data may be processed to obtain the intensity mapping and/or supplement the intensity mapping. For example, the captured visual data may be processed to determine a smoothness/roughness of different portions of the deposited layer(s), a thickness of the deposited layer(s), a temperature associated with different portions of the deposited layer(s), and/or other characteristics of the object. The computing device 105 may generate proposed parameter adjustments based on the captured visual data. In some cases, the detection device 120 may include the imaging devices. In other cases, some or all of the imaging devices may be separate from the computing device 105. The imaging devices may be utilized to capture image and/or video data (e.g., visible-light, infrared, and/or other wavelengths) throughout the manufacturing process. In other cases, the imaging device may be utilized primarily when the manufacturing characteristic is determined to not have been satisfied, e.g. to conserve power and resources until a potential problem has been detected.

At block 750, the computing device 105 adjusts the additive manufacturing process. In some cases, the adjustment(s) may be an adjustment(s) to an initial parameter value(s) and/or a previously adjusted parameter value(s). In some cases, the adjustment(s) may include one or more manufacturing operations to fix specific areas and/or volumes of the layer(s) at which the manufacturing characteristic was not satisfied. In this regard, the manufacturing operation(s) may be localized to these specific areas and/or volumes. As indicated previously, the adjustments may be autonomously proposed by the computing device 105 (e.g., at block 745) and authorized by the user and/or provided by the user to the computing device 105.

In some cases, any adjustments made and/or proposed by the computing device 105 may be stored in the adjusted parameter values 235 in the memory 220 of the computing device 105. The information may also indicate the proposed adjusted parameter values, whether or not the user authorized the proposed values, and/or information utilized to obtain the proposed adjusted parameter values (e.g., intensity maps, other captured image/video data), such as to facilitate the generation and/or adjustment of parameter values for future manufacturing processes.

Thus, using various embodiments, the nanostructures may be utilized to monitor the manufacturing process (e.g., in real time and/or as part of a post-manufacturing inspection). The wavelength components included in a signal emitted from the layer(s) of material with the nanostructures distributed therein can be utilized to determine whether manufacturing operations are properly performed and address potential flaws when detected.

In an embodiment, the emission from the quantum dots may be indicative of whether the quantum dots were distributed properly. For example, if the quantum dots are configured to be removed (e.g., dissolved, melted) as part of the manufacturing operation, the monitoring process may be unable to differentiate between whether the quantum dots were removed by the manufacturing operation or the quantum dots were not mixed in properly with the deposition material. Thus, in various embodiments, detection of signal from the quantum dots is utilized as an indication that the manufacturing operation is properly performed. In this regard, the quantum dots are utilized as a positive indicator that is present (rather than removed) to signify that a manufacturing operation is properly performed.

Although the foregoing description is with reference to a two level system involving a quantum dot and a shell, in some aspects, more than two levels may be utilized. For example, the quantum dot may be encompassed by multiple outer shells. Different shells may be configured with different properties and detected manufacturing characteristics. For example, an outer shell may be utilized for detecting a pressure applied to a layer of material, an inner shell may be utilized for detecting a temperature applied to the layer of material, and so forth for additional shells. In this example, the forming of the layer of material may be defined such that a pressure applied to the layer of material causes the outer shell to be removed, and then heat applied to the layer of material causes the inner shell to be removed, and so forth in cases where there are additional shells. In some cases, the nanostructures and manufacturing process may be designed such that, after the manufacturing operations have been performed properly, the only part of the nanostructures remaining may be the quantum dots.

Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims and their equivalents.

The invention claimed is:

1. A kit comprising:
  a material comprising a plurality of nanostructures distributed therein, wherein each nanostructure comprises a quantum dot and a shell encompassing the quantum dot, wherein the shells are configured to emit a first wavelength in response to an excitation signal, and wherein the quantum dots are configured to emit a second wavelength in response to the excitation signal; and
  a system comprising:
    a manufacturing device configured to form a layer of material from the material and perform a manufacturing operation on the layer of material prior to application of the excitation signal;
    an excitation device configured to apply the excitation signal to at least a portion of the layer of material;
    a detection device configured to detect an emitted signal having a first intensity at the first wavelength and a second intensity at the second wavelength from at least a subset of the plurality of nanostructures in response to the excitation signal; and
    a computing device configured to determine whether a manufacturing characteristic has been satisfied for the layer based at least on the first intensity at the first wavelength and the second intensity at the second wavelength, wherein the computing device determines that the manufacturing characteristic has not yet been satisfied if the second intensity is below a threshold;
    wherein the first wavelength is based on a first band gap associated with the shells of the nanostructures in the portion; and
    wherein the second wavelength is based on a second band gap associated with the quantum dots of the nanostructures in the portion.

2. The kit of claim 1, wherein the computing device is configured to determine whether the manufacturing characteristic has been satisfied based at least on whether the first intensity is below a first threshold and whether the second intensity is above a second threshold.

3. The kit of claim 1, wherein the manufacturing operation comprises heating the layer of material, wherein the manufacturing characteristic comprises a temperature between a melting point associated with the shells and a melting point associated with the quantum dots, and wherein the computing device is configured to determine whether the manufacturing characteristic has been satisfied by determining whether the temperature has been reached for the layer based at least on the first intensity at the first wavelength and the second intensity at the second wavelength.

4. The kit of claim 1, wherein the shells comprise at least one semiconductor material doped with at least one metal material.

5. The kit of claim 1, wherein the layer of material is part of an object formed based on an additive manufacturing process, and wherein the computing device is further configured to interrupt the additive manufacturing process if the manufacturing characteristic is determined to not have been satisfied.

6. The kit of claim 1, wherein:
  the computing device is configured to determine whether the manufacturing characteristic has been satisfied for the layer based at least on the second intensity increasing as the manufacturing characteristic approaches being satisfied; and
  the computing device is configured to determine that the manufacturing characteristic has not been satisfied when no emitted signal is detected by the detection device.

7. The kit of claim 1, wherein:
  the computing device is configured to determine whether the manufacturing characteristic has been satisfied for the layer based at least on the first intensity decreasing and the second intensity increasing as the manufacturing characteristic approaches being satisfied;
  the computing device is implemented as a programmable device which is one or more microprocessors, one or more microcontrollers, one or more application specific integrated circuits (ASICs), and/or one or more programmable logic devices (PLDs) and/or one or more field programmable systems on a chip (FPSCs); and
  the manufacturing operation causes at least one shell of the nanostructures in the portion to be removed, and wherein removal of the at least one shell causes the emitted signal to comprise the second wavelength.

8. The kit of claim 1, wherein the manufacturing operation comprises heating the layer of material to cause at least one shell of the nanostructures in the portion to be removed, wherein the manufacturing characteristic comprises a temperature, and wherein the at least one shell of the nanostructures is removed when the heating the layer of material causes the layer of material to reach the temperature.

9. The kit of claim 8, wherein the layer of material is part of an object formed based on an additive manufacturing process, wherein the computing device is configured to:
  determine whether the manufacturing characteristic has been satisfied for the layer by determining whether the temperature has been reached for the layer based at least on the first intensity at the first wavelength and the second intensity at the second wavelength; and
  interrupt the additive manufacturing process if the temperature is determined to not have been reached.

10. The kit of claim 1, wherein the manufacturing characteristic comprises pressure applied to the layer of material, and wherein the at least one shell is removed when the pressure has been reached for the layer of material.

11. The kit of claim 10, wherein the layer of material is part of an object formed based on an additive manufacturing process, wherein the computing device is configured to:

determine whether the manufacturing characteristic has been satisfied for the layer by determining whether the pressure has been reached for the layer based at least on the first intensity at the first wavelength and the second intensity at the second wavelength; and interrupt the additive manufacturing process if the pressure is determined to not have been reached.

12. The kit of claim 1, wherein the manufacturing operation comprises a curing operation in which the layer of material is maintained at a specified temperature and a specified pressure to cause at least one shell of the nanostructures in the portion to be removed, and wherein the at least one shell is removed after the layer of material is maintained at the specified temperature and the specified pressure for at least a minimum amount of time.

13. The kit system of claim 1, wherein:

the layer of material comprises a first layer;

the manufacturing device is further configured to form a second layer of material over the first layer after determining the manufacturing characteristic has been satisfied for the first layer, wherein the second layer comprises a second plurality of nanostructures distributed therein;

the excitation device is further configured to apply the excitation signal to at least a portion of the second layer of material;

the detection device is further configured to detect a second emitted signal from at least a subset of the second plurality of nanostructures in response to the excitation signal; and the computing device is further configured to determine whether the manufacturing characteristic has been satisfied for the second layer based at least on the second emitted signal.

14. The kit of claim 13, wherein the manufacturing device is further configured to:

perform a manufacturing operation on the second layer; and form a third layer of material while the manufacturing device is performing the manufacturing operation on the second layer.

15. The kit of claim 1, wherein the manufacturing device comprises a printing nozzle configured to:

hold the material comprising the plurality of nanostructures distributed therein; and deposit the material to form the layer of material.

16. The system of claim 15, wherein the manufacturing device further comprises a deposition surface, wherein the printing nozzle is configured to deposit the material on the deposition surface, and wherein the manufacturing device is configured to heat the layer of material at least by heating the deposition surface.

17. The system of claim 5, wherein the computing device is further configured to adjust the additive manufacturing process if the manufacturing characteristic is determined to not have been satisfied.

18. The kit of claim 12, wherein the computing device is configured to determine whether the manufacturing characteristic has been satisfied by determining whether the specified temperature and/or the specified pressure has been reached based at least on the first intensity at the first wavelength and the second intensity at the second wavelength.

19. The kit of claim 1, wherein the computing device comprises a processor and a memory comprising instructions for execution by the processor to determine whether the manufacturing characteristic has been satisfied for the layer based at least on the first intensity at the first wavelength and the second intensity at the second wavelength.

20. The kit of claim 16, wherein the deposition surface has a vacuum surface configured to apply a vacuum suction to the material deposited on the deposition surface.

* * * * *